United States Patent
Mizutani

(10) Patent No.: US 9,215,010 B2
(45) Date of Patent: Dec. 15, 2015

(54) NODE DEVICE, AND CONTROL METHOD AND CONTROL PROGRAM THEREOF

(75) Inventor: Kenji Mizutani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 11 days.

(21) Appl. No.: 14/342,573

(22) PCT Filed: Aug. 29, 2012

(86) PCT No.: PCT/JP2012/005456
§ 371 (c)(1),
(2), (4) Date: Mar. 4, 2014

(87) PCT Pub. No.: WO2013/031219
PCT Pub. Date: Mar. 7, 2013

(65) Prior Publication Data
US 2014/0226989 A1    Aug. 14, 2014

(30) Foreign Application Priority Data

Sep. 2, 2011  (JP) .................................. 2011-191704

(51) Int. Cl.
*H04B 10/00*   (2013.01)
*H04B 10/40*   (2013.01)

(52) U.S. Cl.
CPC ..................................... *H04B 10/40* (2013.01)

(58) Field of Classification Search
USPC ................................................. 398/135–139
See application file for complete search history.

(56) References Cited

U.S. PATENT DOCUMENTS

| | | | |
|---|---|---|---|
| 5,063,612 A * | 11/1991 | McKeown | 398/136 |
| 5,537,241 A * | 7/1996 | Fisher | 398/99 |
| 5,781,318 A * | 7/1998 | Tremblay | 398/22 |
| 5,894,362 A * | 4/1999 | Onaka et al. | 398/95 |
| 5,912,998 A * | 6/1999 | Quayle | 385/24 |
| 5,949,563 A * | 9/1999 | Takada | 398/7 |
| 6,351,582 B1 * | 2/2002 | Dyke et al. | 385/24 |

(Continued)

FOREIGN PATENT DOCUMENTS

| | | |
|---|---|---|
| JP | 2009-88735 A | 4/2009 |
| JP | 2009-100442 A | 5/2009 |

(Continued)

OTHER PUBLICATIONS

B. C. Collings, "Wavelength Selectable Switches and Future Photonic Network Applications", IEEE, 2009, FrII2-4, [retrieved from internet on Apr. 1, 2010], Cited in the Applicant's Specification (paragraph [0007], p. 3).

(Continued)

*Primary Examiner* — Agustin Bello

(57) ABSTRACT

Provided is a node device in an optical communication system in which a plurality of node devices are connected by a plurality of optical fibers, including: at least a first optical transceiver that consumes a first power consumption amount during standby; at least a second optical transceiver that consumes a second power consumption amount greater than the first power consumption amount during standby; and a power consumption control unit that preferentially selects the second optical transceiver as an optical transceiver to be maintained by the node device, the second optical transceiver being in a fast startup standby mode in which startup time from a standby state is shorter than allowable time of interruption time of a communication service in the optical communication system.

10 Claims, 21 Drawing Sheets

(56) References Cited

U.S. PATENT DOCUMENTS

| | | | |
|---|---|---|---|
| 6,563,618 B1* | 5/2003 | Morrow et al. | 398/135 |
| 6,744,964 B1* | 6/2004 | Vittal | 385/140 |
| 6,810,216 B1* | 10/2004 | Tourunen | 398/202 |
| 7,184,667 B2* | 2/2007 | Booth | 398/135 |
| 7,369,771 B2* | 5/2008 | Lee et al. | 398/72 |
| 7,430,374 B2* | 9/2008 | Shinagawa et al. | 398/135 |
| 7,493,047 B2* | 2/2009 | Shinagawa et al. | 398/135 |
| 7,991,294 B2* | 8/2011 | Dreischer et al. | 398/137 |
| 8,509,624 B2* | 8/2013 | Mattahedin | 398/135 |
| 2003/0048512 A1* | 3/2003 | Ota | 359/152 |
| 2003/0156844 A1* | 8/2003 | Naoe | 398/139 |
| 2003/0215243 A1* | 11/2003 | Booth | 398/135 |
| 2006/0018659 A1* | 1/2006 | Sekine et al. | 398/79 |
| 2006/0034611 A1* | 2/2006 | Li | 398/135 |
| 2006/0263093 A1* | 11/2006 | Shinagawa et al. | 398/135 |
| 2008/0310851 A1* | 12/2008 | Ichino | 398/135 |
| 2009/0089601 A1* | 4/2009 | Nonaka et al. | 713/323 |
| 2009/0136234 A1* | 5/2009 | Mottahedin | 398/135 |
| 2009/0317086 A1* | 12/2009 | Morohashi et al. | 398/135 |
| 2010/0166431 A1* | 7/2010 | Wu et al. | 398/135 |
| 2010/0254704 A1* | 10/2010 | Aoki | 398/45 |
| 2011/0064417 A1* | 3/2011 | Sato | 398/135 |
| 2011/0142453 A1* | 6/2011 | Lee et al. | 398/135 |
| 2011/0158638 A1* | 6/2011 | Mie et al. | 398/16 |
| 2012/0045202 A1* | 2/2012 | Jiang et al. | 398/38 |
| 2013/0279918 A1* | 10/2013 | Mizutani et al. | 398/135 |
| 2014/0226989 A1* | 8/2014 | Mizutani | 398/140 |

FOREIGN PATENT DOCUMENTS

| | | |
|---|---|---|
| JP | 2010-193032 A | 9/2010 |
| JP | 2011-9953 A | 1/2011 |
| JP | 2011-10188 A | 1/2011 |
| JP | 2011-77757 A | 4/2011 |
| WO | 2011/043122 A1 | 4/2011 |
| WO | 2012/077327 A1 | 6/2012 |

OTHER PUBLICATIONS

Satoru Okamoto et al., "Network Archtecture for Optical Path Transport Networks", IEEE Transactions on Communication, Aug. 1997, vol. 45, No. 8, pp. 968-977. Cited in the Applicant's Specification (paragraph [0007], p. 3).

Eiichi Horiuchi et al., "GMPLS based Fault Recovery and Extra LSP Service utilizing protecting bandwith", The Institute of Electronics, Information and Communication Engineers, Technical Report of IEICE, Dec. 11, 2003, vol. 103, No. 505, [Internet] URL: <http://www.pilab.jp/activity/PN2003_32.pdf>, with English Abstract. Cited in the Applicant's Specification (paragraph [0007], p. 3).

International Search Report for PCT Application No. PCT/JP2012/005456, mailed on Oct. 2, 2012.

\* cited by examiner

| OPTICAL TRANSCEIVER No. | TYPE | MINIMUM POWER CONSUMPTION AMOUNT CAPABLE OF BEING SET DURING STANDBY [w] | OPERATION MODE |
|---|---|---|---|
| | 402 | 403 | 404 |
| OPTICAL TRANSCEIVER 1 | ENERGY-SAVING | 5 | MINIMUM POWER |
| OPTICAL TRANSCEIVER 2 | EXISTING | 30 | FAST STARTUP |
| OPTICAL TRANSCEIVER 3 | ENERGY-SAVING | 5 | UNMANAGED |
| ... | | | |

| OPTICAL TRANSCEIVER No. 501 | TYPE 502 | OPERATION STATE 503 |
|---|---|---|
| OPTICAL TRANSCEIVER 1 | ENERGY-SAVING | MINIMUM POWER |
| OPTICAL TRANSCEIVER 2 | EXISTING | IN USE |
| OPTICAL TRANSCEIVER 3 | ENERGY-SAVING | MINIMUM POWER |
| ... | | |

| 811 | 812 | 813 | 814 |
|---|---|---|---|
| OPTICAL TRANSCEIVER No. | TYPE | MINIMUM POWER CONSUMPTION AMOUNT CAPABLE OF BEING SET DURING STANDBY [w] | OPERATION MODE |
| OPTICAL TRANSCEIVER 1 | ENERGY-SAVING | 5 | UNMANAGED |
| OPTICAL TRANSCEIVER 2 | EXISTING | 30 | UNMANAGED |
| OPTICAL TRANSCEIVER 3 | ENERGY-SAVING | 5 | UNMANAGED |
| OPTICAL TRANSCEIVER 4 | ENERGY-SAVING | 5 | UNMANAGED |
| OPTICAL TRANSCEIVER 5 | ENERGY-SAVING | 5 | UNMANAGED |
| OPTICAL TRANSCEIVER 6 | EXISTING | 30 | UNMANAGED |
| OPTICAL TRANSCEIVER 7 | ENERGY-SAVING | 5 | UNMANAGED |
| OPTICAL TRANSCEIVER 8 | ENERGY-SAVING | 5 | UNMANAGED |
| OPTICAL TRANSCEIVER 9 | EXISTING | 30 | UNMANAGED |
| OPTICAL TRANSCEIVER 10 | ENERGY-SAVING | 5 | UNMANAGED |

820

| 821 | 822 | 823 | 824 |
|---|---|---|---|
| OPTICAL TRANSCEIVER No. | TYPE | MINIMUM POWER CONSUMPTION AMOUNT CAPABLE OF BEING SET DURING STANDBY [w] | OPERATION MODE |
| OPTICAL TRANSCEIVER 1 | ENERGY-SAVING | 5 | MINIMUM POWER |
| OPTICAL TRANSCEIVER 2 | EXISTING | 30 | (MINIMUM POWER) |
| OPTICAL TRANSCEIVER 3 | ENERGY-SAVING | 5 | MINIMUM POWER |
| OPTICAL TRANSCEIVER 4 | ENERGY-SAVING | 5 | MINIMUM POWER |
| OPTICAL TRANSCEIVER 5 | ENERGY-SAVING | 5 | MINIMUM POWER |
| OPTICAL TRANSCEIVER 6 | EXISTING | 30 | FAST STARTUP |
| OPTICAL TRANSCEIVER 7 | ENERGY-SAVING | 5 | MINIMUM POWER |
| OPTICAL TRANSCEIVER 8 | ENERGY-SAVING | 5 | MINIMUM POWER |
| OPTICAL TRANSCEIVER 9 | EXISTING | 30 | FAST STARTUP |
| OPTICAL TRANSCEIVER 10 | ENERGY-SAVING | 5 | MINIMUM POWER |

| | 911 | 912 | 913 | 914 |
|---|---|---|---|---|
| | OPTICAL TRANSCEIVER No. | TYPE | MINIMUM POWER CONSUMPTION AMOUNT CAPABLE OF BEING SET DURING STANDBY [w] | OPERATION MODE |
| | OPTICAL TRANSCEIVER 1 | ENERGY-SAVING | 5 | MINIMUM POWER |
| | OPTICAL TRANSCEIVER 2 | EXISTING | 30 | (MINIMUM POWER) |
| | OPTICAL TRANSCEIVER 3 | ENERGY-SAVING | 5 | MINIMUM POWER |
| | OPTICAL TRANSCEIVER 4 | ENERGY-SAVING | 5 | MINIMUM POWER |
| | OPTICAL TRANSCEIVER 5 | ENERGY-SAVING | 5 | MINIMUM POWER |
| | OPTICAL TRANSCEIVER 6 | EXISTING | 30 | FAST STARTUP |
| | OPTICAL TRANSCEIVER 7 | ENERGY-SAVING | 5 | MINIMUM POWER |
| | OPTICAL TRANSCEIVER 8 | ENERGY-SAVING | 5 | MINIMUM POWER |
| | OPTICAL TRANSCEIVER 9 | EXISTING | 30 | FAST STARTUP |
| | OPTICAL TRANSCEIVER 10 | ENERGY-SAVING | 5 | MINIMUM POWER |
| | OPTICAL TRANSCEIVER 11 | EXISTING | 30 | UNMANAGED |
| | OPTICAL TRANSCEIVER 12 | ENERGY-SAVING | 5 | UNMANAGED |

920:

| | 921 | 922 | 923 | 924 |
|---|---|---|---|---|
| | OPTICAL TRANSCEIVER No. | TYPE | MINIMUM POWER CONSUMPTION AMOUNT CAPABLE OF BEING SET DURING STANDBY [w] | OPERATION MODE |
| | OPTICAL TRANSCEIVER 1 | ENERGY-SAVING | 5 | MINIMUM POWER |
| | OPTICAL TRANSCEIVER 2 | EXISTING | 30 | (MINIMUM POWER) |
| | OPTICAL TRANSCEIVER 3 | ENERGY-SAVING | 5 | MINIMUM POWER |
| | OPTICAL TRANSCEIVER 4 | ENERGY-SAVING | 5 | MINIMUM POWER |
| | OPTICAL TRANSCEIVER 5 | ENERGY-SAVING | 5 | MINIMUM POWER |
| | OPTICAL TRANSCEIVER 6 | EXISTING | 30 | (MINIMUM POWER) |
| | OPTICAL TRANSCEIVER 7 | ENERGY-SAVING | 5 | MINIMUM POWER |
| | OPTICAL TRANSCEIVER 8 | ENERGY-SAVING | 5 | MINIMUM POWER |
| | OPTICAL TRANSCEIVER 9 | EXISTING | 30 | FAST STARTUP |
| | OPTICAL TRANSCEIVER 10 | ENERGY-SAVING | 5 | MINIMUM POWER |
| | OPTICAL TRANSCEIVER 11 | EXISTING | 30 | FAST STARTUP |
| | OPTICAL TRANSCEIVER 12 | ENERGY-SAVING | 5 | MINIMUM POWER |

FIG. 10

Table 1000 (1010):

| OPTICAL TRANSCEIVER No. | TYPE | MINIMUM POWER CONSUMPTION AMOUNT CAPABLE OF BEING SET DURING STANDBY [w] | OPERATION MODE |
|---|---|---|---|
| OPTICAL TRANSCEIVER 1 | ENERGY-SAVING | 5 | MINIMUM POWER |
| OPTICAL TRANSCEIVER 2 | EXISTING | 30 | (MINIMUM POWER) |
| OPTICAL TRANSCEIVER 3 | ENERGY-SAVING | 5 | MINIMUM POWER |
| OPTICAL TRANSCEIVER 4 | ENERGY-SAVING | 5 | MINIMUM POWER |
| OPTICAL TRANSCEIVER 5 | ENERGY-SAVING | 5 | MINIMUM POWER |
| OPTICAL TRANSCEIVER 6 | EXISTING | 30 | (MINIMUM POWER) |
| OPTICAL TRANSCEIVER 7 | ENERGY-SAVING | 5 | MINIMUM POWER |
| OPTICAL TRANSCEIVER 8 | ENERGY-SAVING | 5 | MINIMUM POWER |
| OPTICAL TRANSCEIVER 9 | EXISTING | 30 | IN USE |
| OPTICAL TRANSCEIVER 10 | ENERGY-SAVING | 5 | MINIMUM POWER |
| OPTICAL TRANSCEIVER 11 | EXISTING | 30 | IN USE |
| OPTICAL TRANSCEIVER 12 | ENERGY-SAVING | 5 | MINIMUM POWER |

Table 1020:

| OPTICAL TRANSCEIVER No. | TYPE | MINIMUM POWER CONSUMPTION AMOUNT CAPABLE OF BEING SET DURING STANDBY [w] | OPERATION MODE |
|---|---|---|---|
| OPTICAL TRANSCEIVER 1 | ENERGY-SAVING | 5 | MINIMUM POWER |
| OPTICAL TRANSCEIVER 2 | EXISTING | 30 | FAST STARTUP |
| OPTICAL TRANSCEIVER 3 | ENERGY-SAVING | 5 | MINIMUM POWER |
| OPTICAL TRANSCEIVER 4 | ENERGY-SAVING | 5 | MINIMUM POWER |
| OPTICAL TRANSCEIVER 5 | ENERGY-SAVING | 5 | MINIMUM POWER |
| OPTICAL TRANSCEIVER 6 | EXISTING | 30 | FAST STARTUP |
| OPTICAL TRANSCEIVER 7 | ENERGY-SAVING | 5 | MINIMUM POWER |
| OPTICAL TRANSCEIVER 8 | ENERGY-SAVING | 5 | MINIMUM POWER |
| OPTICAL TRANSCEIVER 9 | EXISTING | 30 | IN USE |
| OPTICAL TRANSCEIVER 10 | ENERGY-SAVING | 5 | MINIMUM POWER |
| OPTICAL TRANSCEIVER 11 | EXISTING | 30 | IN USE |
| OPTICAL TRANSCEIVER 12 | ENERGY-SAVING | 5 | MINIMUM POWER |

FIG. 11

Table 1100 (1110):

| OPTICAL TRANSCEIVER No. | TYPE | MINIMUM POWER CONSUMPTION AMOUNT CAPABLE OF BEING SET DURING STANDBY [w] | OPERATION MODE |
|---|---|---|---|
| OPTICAL TRANSCEIVER 1 | ENERGY-SAVING | 5 | MINIMUM POWER |
| OPTICAL TRANSCEIVER 2 | EXISTING | 30 | FAST STARTUP |
| OPTICAL TRANSCEIVER 3 | ENERGY-SAVING | 5 | MINIMUM POWER |
| OPTICAL TRANSCEIVER 4 | ENERGY-SAVING | 5 | MINIMUM POWER |
| OPTICAL TRANSCEIVER 5 | ENERGY-SAVING | 5 | MINIMUM POWER |
| OPTICAL TRANSCEIVER 6 | EXISTING | 30 | FAST STARTUP |
| OPTICAL TRANSCEIVER 7 | ENERGY-SAVING | 5 | MINIMUM POWER |
| OPTICAL TRANSCEIVER 8 | ENERGY-SAVING | 5 | MINIMUM POWER |
| OPTICAL TRANSCEIVER 9 | EXISTING | 30 | UNMANAGED |
| OPTICAL TRANSCEIVER 10 | ENERGY-SAVING | 5 | MINIMUM POWER |
| OPTICAL TRANSCEIVER 11 | EXISTING | 30 | IN USE |
| OPTICAL TRANSCEIVER 12 | ENERGY-SAVING | 5 | MINIMUM POWER |

⇩

Table 1120:

| OPTICAL TRANSCEIVER No. | TYPE | MINIMUM POWER CONSUMPTION AMOUNT CAPABLE OF BEING SET DURING STANDBY [w] | OPERATION MODE |
|---|---|---|---|
| OPTICAL TRANSCEIVER 1 | ENERGY-SAVING | 5 | MINIMUM POWER |
| OPTICAL TRANSCEIVER 2 | EXISTING | 30 | (MINIMUM POWER) |
| OPTICAL TRANSCEIVER 3 | ENERGY-SAVING | 5 | MINIMUM POWER |
| OPTICAL TRANSCEIVER 4 | ENERGY-SAVING | 5 | MINIMUM POWER |
| OPTICAL TRANSCEIVER 5 | ENERGY-SAVING | 5 | MINIMUM POWER |
| OPTICAL TRANSCEIVER 6 | EXISTING | 30 | FAST STARTUP |
| OPTICAL TRANSCEIVER 7 | ENERGY-SAVING | 5 (1410) | MINIMUM POWER |
| OPTICAL TRANSCEIVER 8 | ENERGY-SAVING | 5 | MINIMUM POWER |
| OPTICAL TRANSCEIVER 9 | EXISTING | 30 | FAST STARTUP |
| OPTICAL TRANSCEIVER 10 | ENERGY-SAVING | 5 | MINIMUM POWER |
| OPTICAL TRANSCEIVER 11 | EXISTING | 30 | IN USE |
| OPTICAL TRANSCEIVER 12 | ENERGY-SAVING | 5 | MINIMUM POWER |

FIG. 14

Table 1400 (1410):

| OPTICAL TRANSCEIVER No. | TYPE | OPERATION MODE |
|---|---|---|
| OPTICAL TRANSCEIVER 1 | ENERGY-SAVING | MINIMUM POWER |
| OPTICAL TRANSCEIVER 2 | EXISTING | FAST STARTUP |
| OPTICAL TRANSCEIVER 3 | ENERGY-SAVING | MINIMUM POWER |
| OPTICAL TRANSCEIVER 4 | ENERGY-SAVING | MINIMUM POWER |
| OPTICAL TRANSCEIVER 5 | ENERGY-SAVING | MINIMUM POWER |
| OPTICAL TRANSCEIVER 6 | EXISTING | IN USE |
| OPTICAL TRANSCEIVER 7 | ENERGY-SAVING | MINIMUM POWER |
| OPTICAL TRANSCEIVER 8 | ENERGY-SAVING | MINIMUM POWER |
| OPTICAL TRANSCEIVER 9 | EXISTING | IN USE |
| OPTICAL TRANSCEIVER 10 | ENERGY-SAVING | FAST STARTUP |
| OPTICAL TRANSCEIVER 11 | EXISTING | IN USE |
| OPTICAL TRANSCEIVER 12 | ENERGY-SAVING | FAST STARTUP |

⇩

Table 1420:

| OPTICAL TRANSCEIVER No. | TYPE | OPERATION MODE |
|---|---|---|
| OPTICAL TRANSCEIVER 1 | ENERGY-SAVING | MINIMUM POWER |
| OPTICAL TRANSCEIVER 2 | EXISTING | IN USE |
| OPTICAL TRANSCEIVER 3 | ENERGY-SAVING | MINIMUM POWER |
| OPTICAL TRANSCEIVER 4 | ENERGY-SAVING | MINIMUM POWER |
| OPTICAL TRANSCEIVER 5 | ENERGY-SAVING | MINIMUM POWER |
| OPTICAL TRANSCEIVER 6 | EXISTING | IN USE |
| OPTICAL TRANSCEIVER 7 | ENERGY-SAVING | MINIMUM POWER |
| OPTICAL TRANSCEIVER 8 | ENERGY-SAVING | MINIMUM POWER |
| OPTICAL TRANSCEIVER 9 | EXISTING | IN USE |
| OPTICAL TRANSCEIVER 10 | ENERGY-SAVING | FAST STARTUP |
| OPTICAL TRANSCEIVER 11 | EXISTING | IN USE |
| OPTICAL TRANSCEIVER 12 | ENERGY-SAVING | FAST STARTUP |

FIG. 15

Table 1510 (1500):

| OPTICAL TRANSCEIVER No. | TYPE | MINIMUM POWER CONSUMPTION AMOUNT CAPABLE OF BEING SET DURING STANDBY [w] | OPERATION MODE |
|---|---|---|---|
| OPTICAL TRANSCEIVER 1 | ENERGY-SAVING | 5 | MINIMUM POWER |
| OPTICAL TRANSCEIVER 2 | EXISTING | 30 | IN USE |
| OPTICAL TRANSCEIVER 3 | ENERGY-SAVING | 5 | MINIMUM POWER |
| OPTICAL TRANSCEIVER 4 | ENERGY-SAVING | 5 | MINIMUM POWER |
| OPTICAL TRANSCEIVER 5 | ENERGY-SAVING | 5 | MINIMUM POWER |
| OPTICAL TRANSCEIVER 6 | EXISTING | 30 | IN USE |
| OPTICAL TRANSCEIVER 7 | ENERGY-SAVING | 5 | MINIMUM POWER |
| OPTICAL TRANSCEIVER 8 | ENERGY-SAVING | 5 | MINIMUM POWER |
| OPTICAL TRANSCEIVER 9 | EXISTING | 30 | IN USE |
| OPTICAL TRANSCEIVER 10 | ENERGY-SAVING | 25 | FAST STARTUP |
| OPTICAL TRANSCEIVER 11 | EXISTING | 30 | IN USE |
| OPTICAL TRANSCEIVER 12 | ENERGY-SAVING | 25 | FAST STARTUP |

Table 1520:

| OPTICAL TRANSCEIVER No. | TYPE | MINIMUM POWER CONSUMPTION AMOUNT CAPABLE OF BEING SET DURING STANDBY [w] | OPERATION MODE |
|---|---|---|---|
| OPTICAL TRANSCEIVER 1 | ENERGY-SAVING | 5 | MINIMUM POWER |
| OPTICAL TRANSCEIVER 2 | EXISTING | 30 | IN USE |
| OPTICAL TRANSCEIVER 3 | ENERGY-SAVING | 5 | MINIMUM POWER |
| OPTICAL TRANSCEIVER 4 | ENERGY-SAVING | 5 | MINIMUM POWER |
| OPTICAL TRANSCEIVER 5 | ENERGY-SAVING | 5 | MINIMUM POWER |
| OPTICAL TRANSCEIVER 6 | EXISTING | 30 | IN USE |
| OPTICAL TRANSCEIVER 7 | ENERGY-SAVING | 5 | MINIMUM POWER |
| OPTICAL TRANSCEIVER 8 | ENERGY-SAVING | 25 | FAST STARTUP |
| OPTICAL TRANSCEIVER 9 | EXISTING | 30 | IN USE |
| OPTICAL TRANSCEIVER 10 | ENERGY-SAVING | 25 | FAST STARTUP |
| OPTICAL TRANSCEIVER 11 | EXISTING | 30 | IN USE |
| OPTICAL TRANSCEIVER 12 | ENERGY-SAVING | 25 | FAST STARTUP |

NODE DEVICE, AND CONTROL METHOD AND CONTROL PROGRAM THEREOF

This application is a National Stage Entry of PCT/JP2012/005456 filed on Aug. 29, 2012, which claims priority from Japanese Patent Application 2011-191704 filed on Sep. 2, 2011, the contents of all of which are incorporated herein by reference, in their entirety.

TECHNICAL FIELD

The present invention relates to a technique of electric power saving in an optical communication system.

BACKGROUND ART

The traffic capacity of networks is expected to increase drastically, from not only a recent increase in network population, but also demands for the delivery of high-definition motion pictures or desire for bidirectional real-time video services typified by a television telephone. With this traffic increase, the power consumption of optical communication networks is also expected to increase drastically (see FIGS. 2 and 3 of Paper 5.5.3, ECOC 2009).

In order to realize a drastic reduction in power consumption even at the peak of such network traffic, research related to optical path networks disclosed in Non-Patent Document 1 and Non-Patent Document 2 has been performed. In these optical path networks, a route that connects a starting point and an ending point is set and secured in advance. Therefore, it is possible to omit electro-optic/optic-electro (OE/EO) conversion using an optical transceiver or routing calculation in anode located in the middle of the path. In addition, an aggregation device of optical transceivers as disclosed in Non-Patent Document 1 and Patent Document 1 is introduced. Through the sharing of the optical transceivers using the aggregation device, it is possible to freely establish the same number of optical paths as the optical transceivers deployed. Such a function can be applied to a network capable of being dynamically reconstructed according to the usage condition of a network.

On the other hand, an application that is required high reliability like electronic commerce and so on is currently used in an optical network, as disclosed in Non-Patent Document 3. Thus, in order to realize the high reliability thereof, a network having no service interruption is required. When a failure occurs, the service interruption time is required to be suppressed to a minimum, for example, to 50 milliseconds (msec) as a criterion.

As an optical transceiver for realizing both such a reduction in power consumption and the high reliability of a network, for example, the following Patent Document 2 and Patent Document 3 are proposed. For example, Patent Document 2 discloses a method in which a power supply unit of an interface modulation unit and a data processing unit which have high power consumption is turned off. In addition, Patent Document 3 discloses a method in which signal energy is minimized while monitoring signal quality between counter transceivers.

RELATED DOCUMENT

Patent Document

[Patent Document 1] PCT International Publication No. WO2011/043122
[Patent Document 2] Japanese Unexamined Patent Application Publication No. 2010-193032
[Patent Document 3] Japanese Unexamined Patent Application Publication No. 2011-077757

Non-Patent Document

[Non-Patent Document 1] B. C. Collings, Photonics in Switching 2009, Frll2-4
[Non-Patent Document 2] "Network Architecture for Optical Path Transport Networks," IEEE Transaction on Communications, Vol. 45, Issue 8, 1997, p 968-977
[Non-Patent Document 3] "GMPLS Based Fault Recovery and Extra LSP Service utilizing Protection Bandwidth," Technical Report of IEICE Vol. 103, No. 505, Published on Dec. 11, 2003 (http://www.pilab.jp/activity/PN2003_32.pdf)

DISCLOSURE OF THE INVENTION

However, in the technique of Patent Document 2 and Patent Document 3 mentioned above, main components such as an optical device for transmission are kept in an on-state in order to realize fast boot, the time of which is shorter than the interruption time and which is required in a network. For this reason, a power consumption reduction effect is restricted.

The inventor has previously proposed a power consumption reduction technique in which an optical transceiver having a plurality of standby modes (hereinafter, called an energy-saving optical transceiver) is switched to an appropriate mode, in a node device in which optical transceivers are shared by an aggregation device for the optical transceivers. By this technique, a power consumption reduction effect has been remarkably improved while both the high reliability of a network and a reduction in power consumption are realized.

However, the above proposed technique is designed for a configuration in which energy-saving optical transceivers having a plurality of standby modes are deployed. Therefore, appropriate power consumption control for a configuration in which energy-saving optical transceivers and conventional optical transceivers (optical transceivers which is without a plurality of standby modes and switches conduction/cutoff of light) are mixed is required. That is, both the high reliability of a network and a reduction in power consumption are required for a configuration in which optical transceivers having different power consumption amounts during standby are deployed.

An object of the present invention is to provide a technique for solving the above-mentioned problem.

In order to achieve the aforementioned object, according to the present invention, there is provided a node device in an optical communication system in which a plurality of the node devices are connected by a plurality of optical fibers, including: at least a first optical transceiver that consumes a first power consumption amount during standby; at least a second optical transceiver that consumes a second power consumption amount greater than the first power consumption amount during standby; and a power consumption control unit that preferentially selects the second optical transceiver as an optical transceiver to be maintained by the node device, the second optical transceiver being in a fast startup standby mode in which startup time from a standby state is shorter than allowable time of interruption time of a communication service in the optical communication system.

In order to achieve the aforementioned object, according to the present invention, there is provided a method of controlling a node device in an optical communication system in which a plurality of the node devices are connected by a plurality of optical fibers, the node device including at least a first optical transceiver that consumes a first power consumption amount during standby and at least a second optical transceiver that consumes a second power consumption amount greater than the first power consumption amount during standby, the method including a power consumption control step of preferentially selecting the second optical transceiver as an optical transceiver to be maintained in a fast startup standby mode in which startup time from a standby state is shorter than allowable time of interruption time of a communication service in the optical communication system.

In order to achieve the aforementioned object, according to the present invention, there is provided a control program of a node device in an optical communication system in which a plurality of the node devices are connected by a plurality of optical fibers, the node device including at least a first optical transceiver that consumes a first power consumption amount during standby and at least a second optical transceiver that consumes a second power consumption amount greater than the first power consumption amount during standby, the program causing a computer to execute a power consumption control step of preferentially selecting the second optical transceiver as an optical transceiver to be maintained in a fast startup standby mode in which startup time from a standby state is shorter than allowable time of interruption time of a communication service in the optical communication system.

According to the present invention, it is possible to achieve both a reduction in power consumption and the high reliability of a network in a configuration in which optical transceivers having different power consumption amounts during standby are deployed.

BRIEF DESCRIPTION OF THE DRAWINGS

The above-mentioned objects, other objects, features and advantages will be made clearer from the preferred exemplary embodiments described below, and the following accompanying drawings.

FIG. 4 is a diagram illustrating a configuration of a standby management table according to the second exemplary embodiment of the invention.

FIG. 5 is a diagram illustrating a configuration of a use condition table according to the second exemplary embodiment of the invention.

FIG. 8 is a diagram illustrating a change in a standby management table during an initial period according to the second exemplary embodiment of the invention.

FIG. 9 is a diagram illustrating a change in a standby management table during optical transceiver addition according to the second exemplary embodiment of the invention.

FIG. 10 is a diagram illustrating a change in a standby management table during optical path establishment (during optical transceiver startup) according to the second exemplary embodiment of the invention.

FIG. 11 is a diagram illustrating a change in a standby management table during optical path deletion (during optical transceiver release) according to the second exemplary embodiment of the invention.

FIG. 14 is a diagram illustrating a change in a use condition table during optical transceiver startup according to the third exemplary embodiment of the invention.

FIG. 15 is a diagram illustrating a change in a standby management table during optical transceiver startup according to the third exemplary embodiment of the invention.

DESCRIPTION OF EXEMPLARY EMBODIMENTS

Hereinafter, exemplary embodiments of the present invention will be illustratively described in detail with reference to the accompanying drawings. However, components described in the following exemplary embodiments are merely illustrative, and the technical scope of the present invention is not intended to be limited only thereto.

First Exemplary Embodiment

A node device 110 in an optical communication system 100 according to a first exemplary embodiment of the present invention will be described below with reference to FIG. 1. The optical communication system 100 is a system in which a plurality of node devices are connected to each other by a plurality of optical fibers 120.

Figure 1:
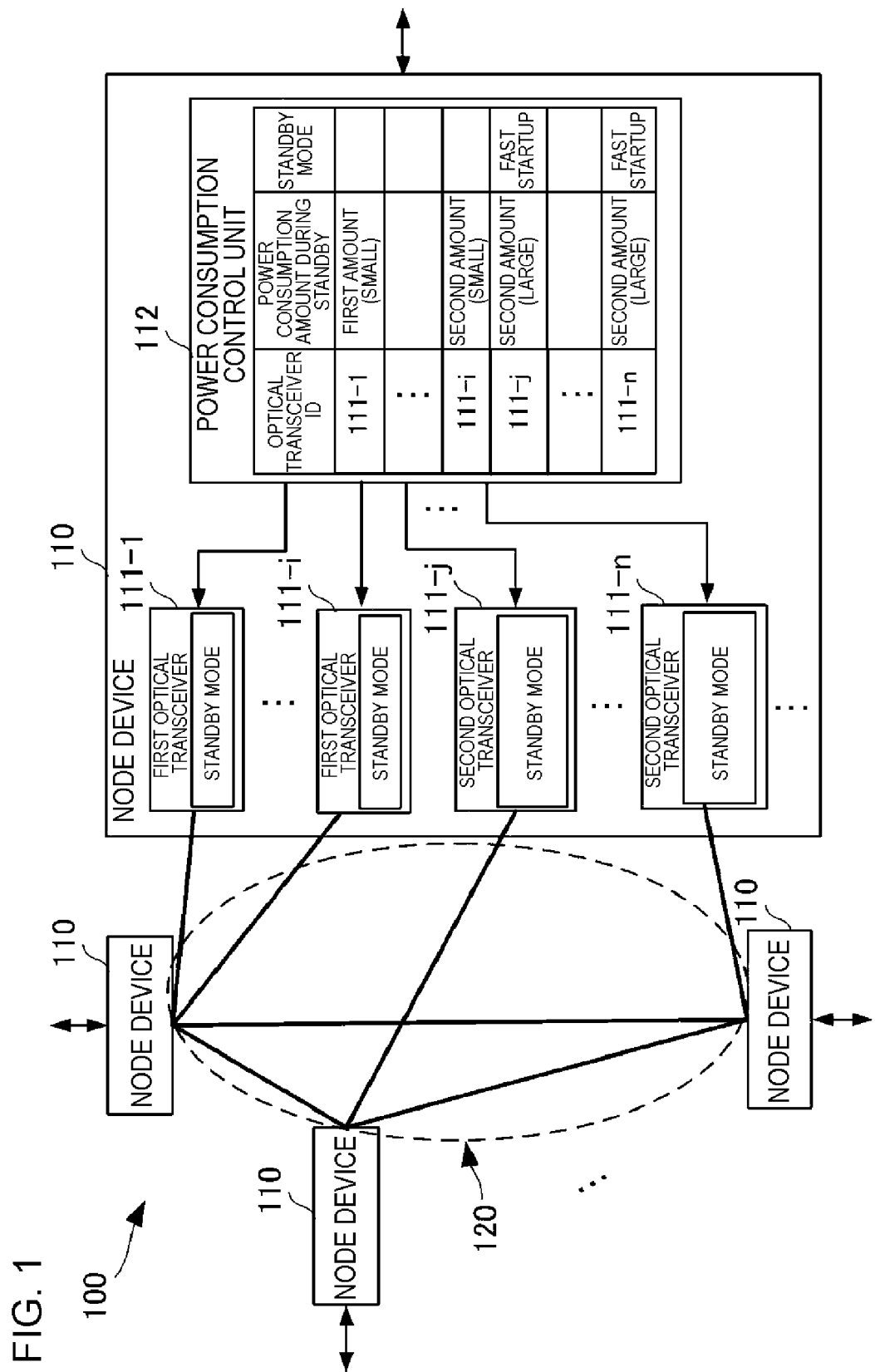
FIG. 1 is a block diagram illustrating a configuration of an optical communication system according to a first exemplary embodiment of the invention.

As shown in FIG. 1, the node device 110 of the optical communication system 100 includes at least one of first optical transceivers 111-1 to 111-$i$, at least one of second optical transceivers 111-$j$ to 111-$n$, and a power consumption control unit 112. The first optical transceivers 111-1 to 111i consume a first power consumption amount during standby. The second optical transceivers 111-j to 111-n consume a second power consumption amount greater than the first power consumption amount during standby. The power consumption control unit 112 preferentially selects the second optical transceivers 111-j to 111-n as optical transceivers to be maintained by the node device 110, the second optical transceivers 111-j to 111-n being in a standby mode (hereinafter, referred to as a fast startup mode) in which startup time from a standby state is shorter than the allowable time of interruption time of a communication service in the optical communication system 100.

According to the present exemplary embodiment, in a configuration in which optical transceivers having different power consumption amounts during standby are mixed, it is possible to achieve both a reduction in power consumption and high reliability of a network.

Second Exemplary Embodiment

Next, an optical communication system according to a second exemplary embodiment of the present invention will be described. In the present exemplary embodiment, the node device of the optical communication system is provided with an energy-saving optical transceiver having a standby mode in which its power consumption is large but it is capable of the fast startup and another standby mode in which it is capable of the fast startup but its power consumption is small. In addition, conventional optical transceivers are also deployed in which the only operation thereof during standby when unused is shutting-down of an optical output, and the power consumption amount during standby is hardly different from that during standby. In the node device having such a configuration, the conventional optical transceiver is preferentially selected as an optical transceiver being in a fast startup mode.

According to the present exemplary embodiment, it is possible to achieve a reduction in total power consumption while maintaining the number of optical transceivers capable of fast startup and maintaining the high reliability of a network.

In order to avoid complicated description, a reduction in power consumption in two types of an energy-saving optical transceiver and a conventional optical transceiver will be described in the present exemplary embodiment and the subsequent exemplary embodiments. However, the same control method can be applied even when three types or more thereof are mixed. In such cases, in a reduction in power consumption in the node device in which a plurality of energy-saving optical transceivers having different power consumption are mixed, the same control method can also be applied. That is, it is possible to preferentially use an optical transceiver in a standby mode having larger power consumption of the present exemplary embodiment, and to apply processing of preferentially performing setting to a fast startup mode.

<<Configuration of Optical Communication System>>

Figure 2:
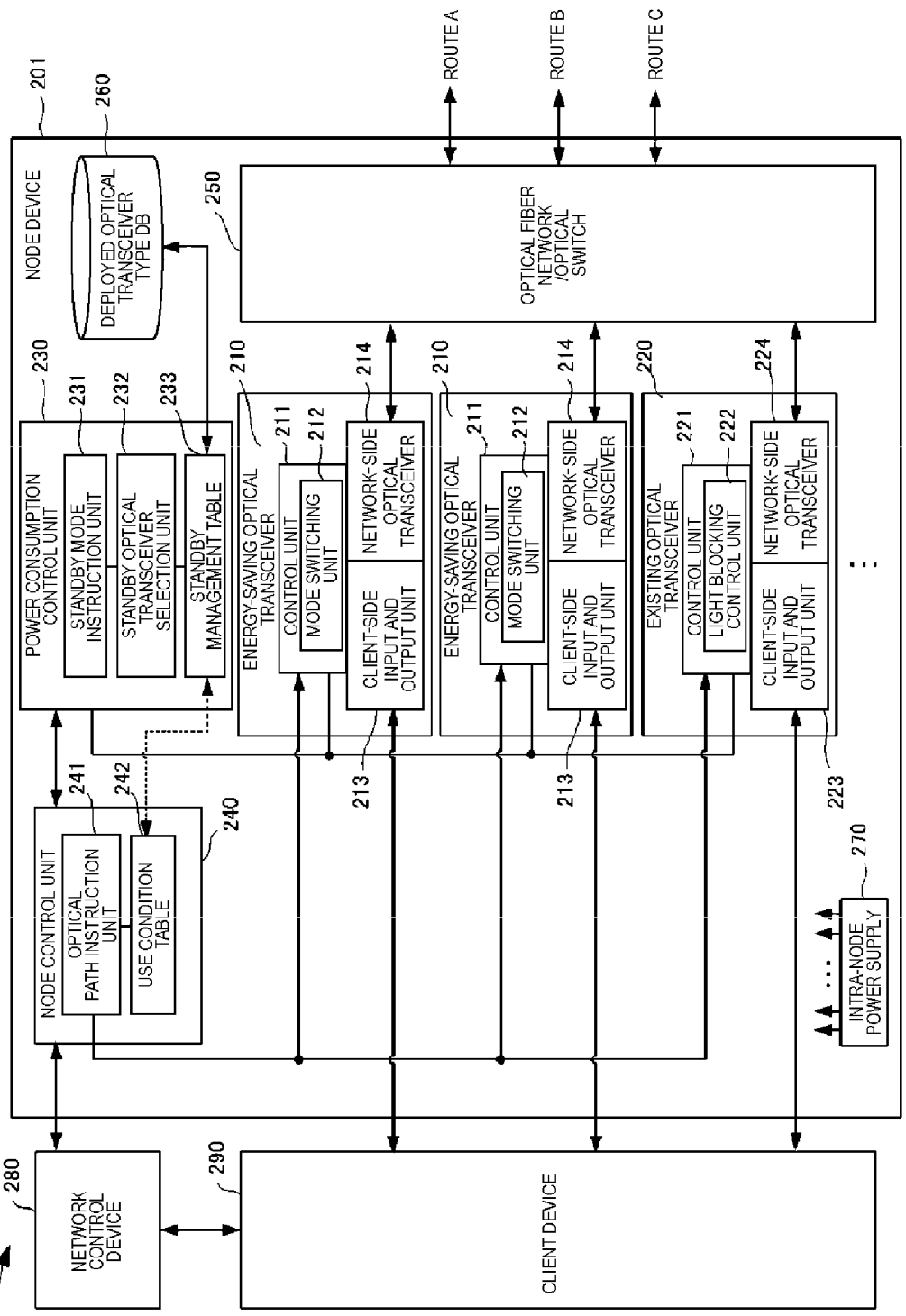
FIG. 2 is a block diagram illustrating a configuration of an optical communication system according to a second exemplary embodiment of the invention.

FIG. 2 is a block diagram illustrating a configuration of an optical communication system 200 according to the present exemplary embodiment.

The optical communication system 200 includes a node device 201 that establishes an optical path between an external optical network and a client device 290, the client device 290, and a network control device 280 that controls the generation or release of the optical path.

The node device 201 includes an optical transceiver group constituted by two types of optical transceivers.

One of the two types of optical transceivers is an energy-saving optical transceiver 210 having three operation modes of a normal operation mode, a fast startup mode, and a minimum power mode. In the normal operation mode, optical communication is relayed. In a fast startup mode, a reduction in power consumption becomes small since power supply to portions required for fast startup is maintained, and fast startup is enabled within a service interruption time. In the minimum power mode, although fast startup is disabled, power supply is minimized since power consumption is reduced to become minimum. Each of the energy-saving optical transceivers 210 includes a control unit 211, a mode switching unit 212, a client-side input and output unit 213 which is connected to the client device 290, and a network-side optical transceiver 214 which is selectively connected to routes A to C of an external network by an optical fiber network/optical switch 250.

The other one is a conventional optical transceiver 220 in which the only operation thereof is to shut down an optical output during standby in an unused state, and the power consumption amount during standby is hardly different from that during standby. The conventional optical transceiver 220 includes a control unit 221, a light blocking control unit 222, a client-side input and output unit 223 which is connected to the client device 290, and a network-side optical transceiver 224 which is selectively connected to the routes A to C of the external network by the optical fiber network/optical switch 250.

In addition, the node device 201 includes a node control unit 240 that manages the establishment/deletion of the optical path with respect to other nodes, and a power consumption control unit 230 that suppresses power consumption of the optical transceiver on standby.

The node control unit 240 includes an optical path instruction unit 241 that gives an instruction for the startup of the optical transceiver for establishing an optical path and an instruction for the standby of the optical transceiver for deleting the optical path. In addition, the node control unit includes a use condition table 242 for managing the optical transceiver which is used for the establishment/deletion of an optical path in use and for managing the backup thereof.

The power consumption control unit 230 includes a standby mode instruction unit 231 that gives an instruction for switching of a standby mode of the energy-saving optical transceiver 210 and an instruction for light blocking of the conventional optical transceiver 220. In addition, the power consumption control unit includes a standby optical transceiver selection unit 232 that selects which optical transceiver is put on standby at fast startup and which optical transceiver is put on standby at minimum power. The power consumption control unit includes a standby management table 233 that manages the standby state of an optical transceiver which is on standby in an unused state.

Note that, the use condition table 242 of the node control unit 240 and the standby management table 233 of the power consumption control unit 230 are assumed to share information.

In addition, the node device 201 includes a deployed optical transceiver type database (hereinafter, referred to as a DB) 260 having information about the type of the deployed optical transceiver and the power consumption amount during standby of that. An intra-node power supply 270 supplies power to each configuration unit within the node device 201. In the present exemplary embodiment, while maintaining the high reliability of a network by maintaining the number of optical transceivers capable of fast startup, the power consumption of the intra-node power supply 270 is reduced.

The node device 201 establishes/deletes an optical path between other nodes using the node control unit 240 in accordance with instructions from the network control device 280 that administers the control of the entire network or the control between the nodes.

When the optical path is established, an ADD operation for a signal from the client device 290 to a fiber route connected to another node and a DROP operation for a signal from another node to the client device 290 are performed. In the node device 201, an optical transceiver capable of fast startup is selected from unused optical transceivers on the basis of information managed in the standby management table 233. Next, the optical fiber network/optical switch 250 is set, an optical path is established, and communication with another node is realized.

On the other hand, when the optical path is deleted, the ADD operation for a signal from the client device 290 to a fiber route connected to another node and the DROP operation for a signal from another node to the client device 290 are released. In the node device 201, first, an optical output from the optical transceiver in use is set not to come out, and then the optical transceiver is put on standby. Simultaneously, the setting of the optical fiber network/optical switch 250 which is set for the optical path establishment is released.

Further, the node device 201 performs power saving control on the optical transceiver group so as to be capable of optimizing a power consumption amount reduction effect of the energy-saving optical transceiver 210. That is, the power consumption control unit 230 puts on standby in a fast startup mode a necessary number of optical transceivers for maintaining high reliability in a network and optical transceivers used for newly establishing an optical path, with respect to the optical transceiver group which is on standby. The remaining unused energy-saving optical transceivers are put on standby at minimum power. In this manner, from the information of the power consumption amount during standby of the standby management table 233 acquired from the deployed optical transceiver type DB 260, the conventional optical transceiver 220 is preferentially put on standby in a fast startup mode by the standby optical transceiver selection unit 232. On the other hand, the energy-saving optical transceiver 210 is preferentially selected, and is put on standby in a minimum power mode.

(Deployed Optical Transceiver Type DB)

Figure 3:
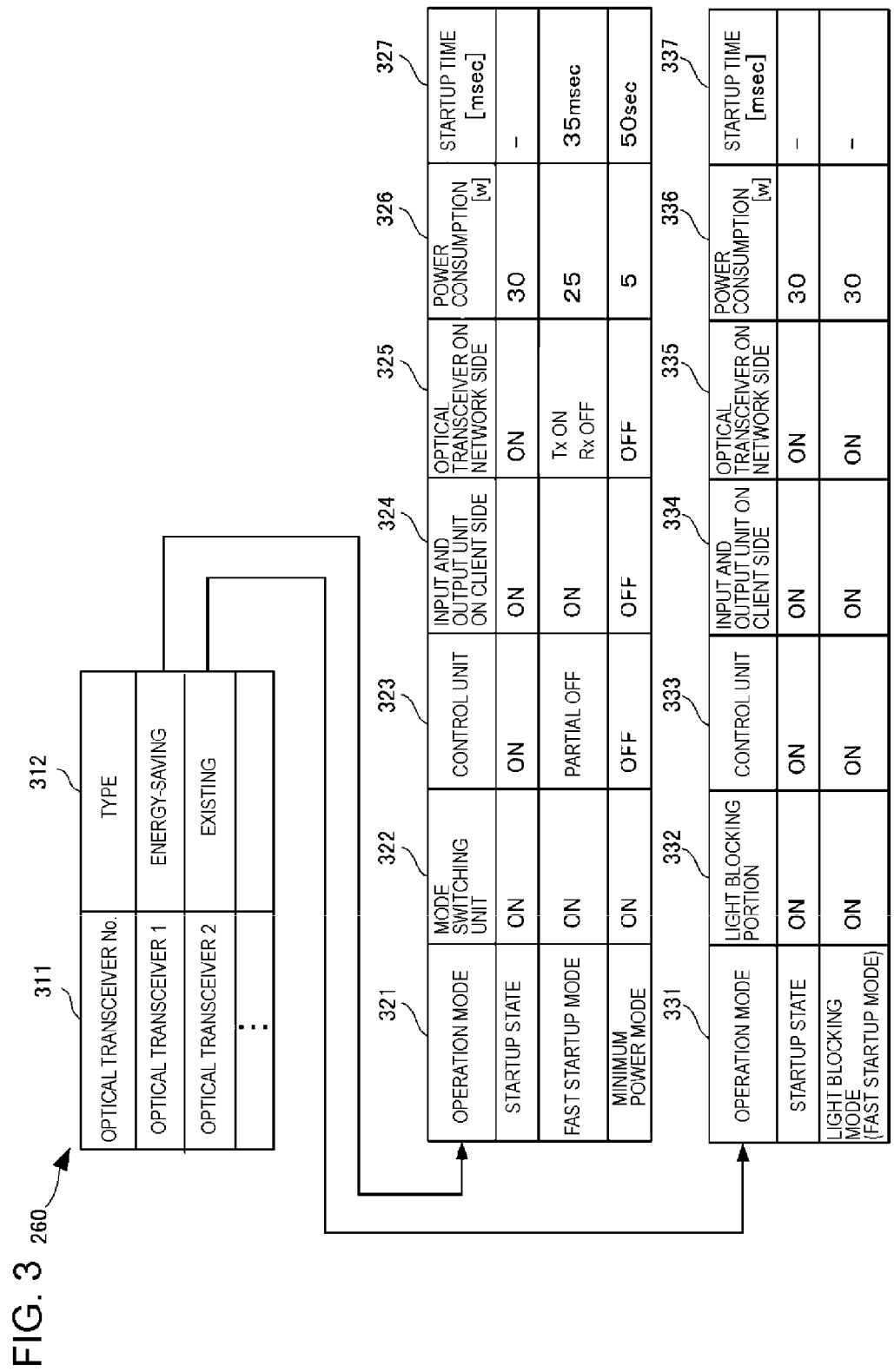
FIG. 3 is a diagram illustrating a configuration of a deployed optical transceiver type DB according to the second exemplary embodiment of the invention.

FIG. 3 is a diagram illustrating a configuration of the deployed optical transceiver type DB 260 according to the present exemplary embodiment.

The deployed optical transceiver type DB 260 has two configurations. One of the two is type data indicating whether a type of each deployed optical transceiver is an energy-saving type or a conventional type. The other one is control data indicating, for each of the energy-saving type and the conventional type, the power consumption in a startup state or the power consumption and startup time in each standby mode.

In the type data, a type 312 is stored in association with an optical transceiver No. 311. In a case of the energy-saving type, power supply 322 to a mode switching unit, power supply 323 to the control unit, power supply 324 to the client-type input and output unit, and power supply 325 to the network-side optical transceiver are stored in the control data, in association with an operation mode 321. Power consumption 326 that is the sum of the respective power supplies and startup time 327 during startup are stored for the operation mode. In a case of the conventional type, power supply 332 to the light blocking portion, power supply 333 to the control unit, power supply 334 to the client-type input and output unit, and power supply 335 to the network-side optical transceiver are stored in association with an operation mode 331. Power consumption 336 that is the sum of the respective power supplies and startup time 337 during startup are stored for the operation mode. Note that, although the power consumption of the light blocking mode, which is a conventional operation mode, is different from that of the energy-saving fast startup mode, the light blocking mode is hereinafter called a fast startup mode since it can be regarded as a fast startup mode because of its capability of immediate startup.

Note that, FIG. 3 is an example and not a limitation. The power consumption and the startup time also vary depending on the type or the like.

(Standby Management Table)

FIG. 4 is a diagram illustrating a configuration of the standby management table 233 according to the present exemplary embodiment. The standby management table 233 is generated in accordance with data of the deployed optical transceiver type DB 260.

In the standby management table 233, a type 402, a minimum power consumption amount 403 capable of being set during standby based on the type 402, and a current operating state 404 are stored in association with an optical transceiver No. 401. In the present exemplary embodiment, 5 W during a minimum power mode is stored as a minimum power consumption amount of the energy-saving optical transceiver in the minimum power consumption amount 403. In addition, 30 W during a fast startup mode is stored as a minimum power consumption amount of the conventional optical transceiver. In addition, fast startup/minimum power/non-management (during addition or release) are stored in the operating state 404 in a case of the energy-saving optical transceiver, and fast startup/non-management are stored therein in a case of the conventional optical transceiver.

(Use Condition Table)

FIG. 5 is a diagram illustrating a configuration of the use condition table 242 according to the present exemplary embodiment. The use condition table 242 is generated in accordance with data of the standby management table 233 and instructions of the optical path instruction unit 241.

In the use condition table 242, a type 502 and a current operating state 503 are stored in association with an optical transceiver No. 501. In-use/fast startup/minimum power are stored in the operating state 503 in a case of the energy-saving optical transceiver, and in-use/fast startup are stored therein in a case of the conventional optical transceiver.

<<Hardware Configuration of Node Device>>

Figure 6:
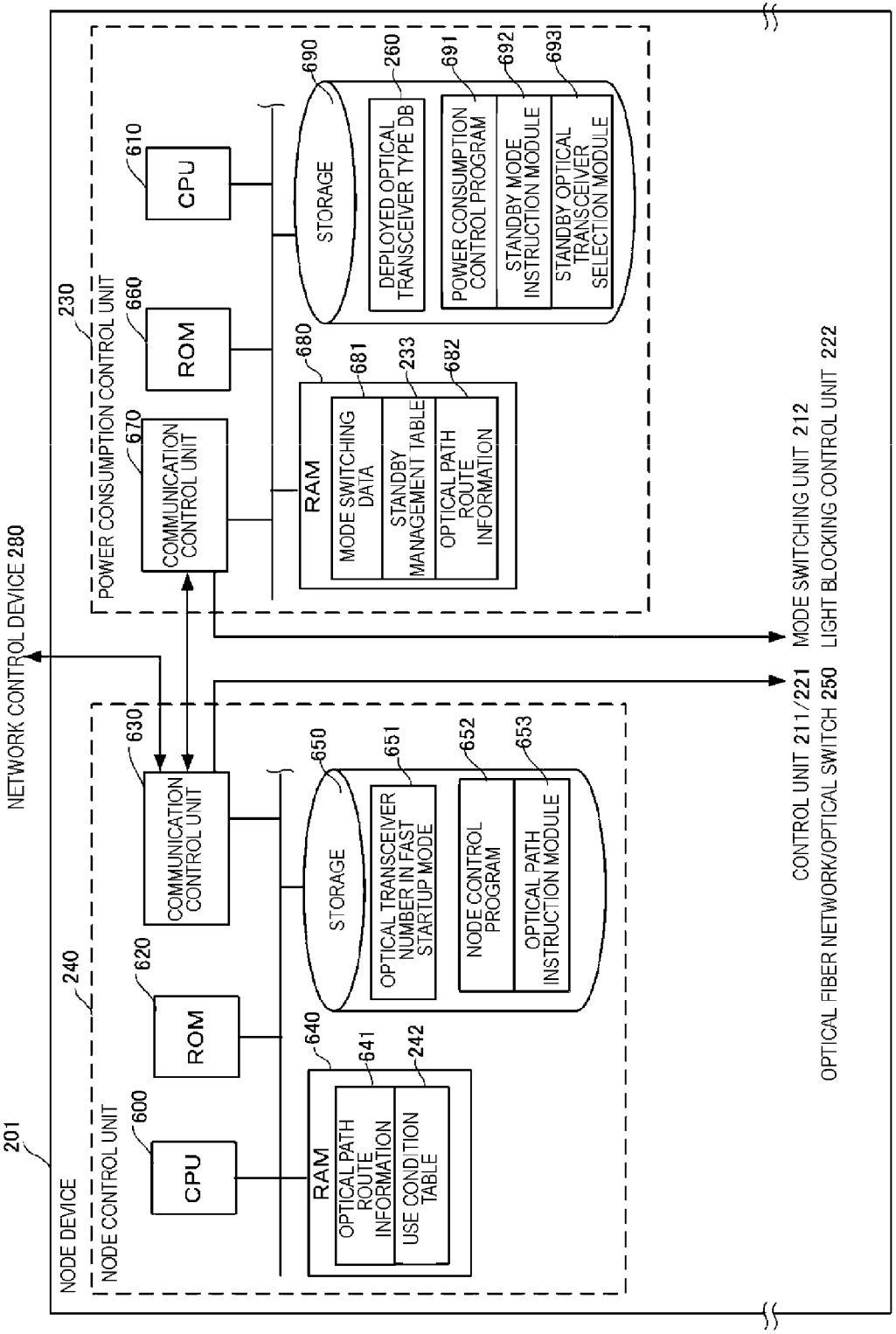
FIG. 6 is a block diagram illustrating a hardware configuration according to a node device of the second exemplary embodiment of the invention.

FIG. 6 is a block diagram illustrating a hardware configuration of the node device 201 according to the present exemplary embodiment. Note that, FIG. 6 illustrates an example of a case where the node control unit 240 is controlled by a processor different from that controlling the power consumption control unit 230 and inter-device communication is performed between the node control unit 240 and the power consumption control unit 230.

First, the configuration of the node control unit 240 will be described. A CPU 600 is a processor for arithmetic control, and realizes each function configuration unit of the node control unit 240 shown in FIG. 2 by executing a program. A ROM 620 stores initial data, fixed data for a program or the like, and a program. A communication control unit 630 communicates with the network control device 280, a communication control unit 670 of the power consumption control unit 230, the control units 211 and 221, and the optical fiber network/optical switch 250. The communication may be wireless or wired. Note that, the fixed data and the program may be stored in a storage 650.

A RAM 640 is a random access memory used as a temporary storage work area by the CPU 600. Areas for storing data required for implementing the present exemplary embodiment are secured in the RAM 640. Optical path route information 641 received from the network control device 280 and the use condition table 242 shown in FIG. 2 are stored in each of the areas. Note that, a method may be used in which the optical path route information 641 and the use condition table 242 are stored in the storage 650, and are read out and used in the RAM 640.

The storage 650 is a mass storage device that stores a database, various types of parameters, and a program executed by the CPU 600, in a nonvolatile manner. The following data or program required for implementing the present exemplary embodiment is stored in the storage 650. As the data, an optical transceiver number 651 in a fast startup mode, which the node device 201 has to hold constantly because of setting by the network control device 280, is stored. The optical transceiver number 651 in a fast startup mode is used in the management of a standby mode by the power consumption control unit 230. Therefore, the optical transceiver number may be held in a storage 690 of the power consumption control unit 230. In addition, in the present exemplary embodiment, as the program, a node control program 652 indicating an optical path control procedure of the entire node device is stored. In addition, in the node control program 652, an optical path instruction module 653 that gives instruction for the startup/stop of each optical transceiver in accordance with an optical path is stored.

Next, the configuration of the power consumption control unit 230 will be described. A CPU 610 is a processor for arithmetic control, and realizes each function configuration unit of the power consumption control unit 230 shown in FIG. 2 by executing a program. A ROM 660 stores initial data, fixed data for a program or the like, and a program. The communication control unit 670 communicates with the communication control unit 630 of the node control unit 240, the mode switching unit 212, and the light blocking control unit 222. The communication may be wireless or wired. Note that, the fixed data and the program may be stored in the storage 690.

A RAM 680 is a random access memory used as a temporary storage work area by the CPU 610. Areas for storing data required for implementing the present exemplary embodiment are secured in the RAM 680. Mode switching data 681 indicating mode switching of each mode switching unit 212, the standby management table 233 shown in FIG. 2, and optical path route information 682 in common with the optical path route information 641 are stored in each of the areas. Note that, a method may be used in which the mode switching data 681, the standby management table 233, and the optical path route information 682 are stored in the storage 690, and are read out and used in the RAM 680.

The storage 690 is a mass storage device that stores a database, various types of parameters, and a program executed by the CPU 610, in a nonvolatile manner. The following data or program required for implementing the present exemplary embodiment is stored in the storage 690. As the data, the deployed optical transceiver type DB 260 shown in FIG. 2 is stored. In addition, in the present exemplary embodiment, as the program, a power consumption control program 691 for controlling the power consumption of the entire node device is stored. In addition, in the power consumption control program 691, a standby mode instruction module 692 that gives instruction for a standby mode of each optical transceiver is stored. In addition, in the power consumption control program 691, a standby optical transceiver selection module 693 that selects a standby mode of the optical transceiver is stored.

Note that, only the data or program essential for the present exemplary embodiment is shown in the ROM 620, the ROM 660, the RAM 640, the RAM 680, and the storages 650 and 690 of FIG. 6, and general-purpose data or a program such as an OS is not shown.

<<Processing Procedure of Power Consumption Control Unit>>

Figure 7:
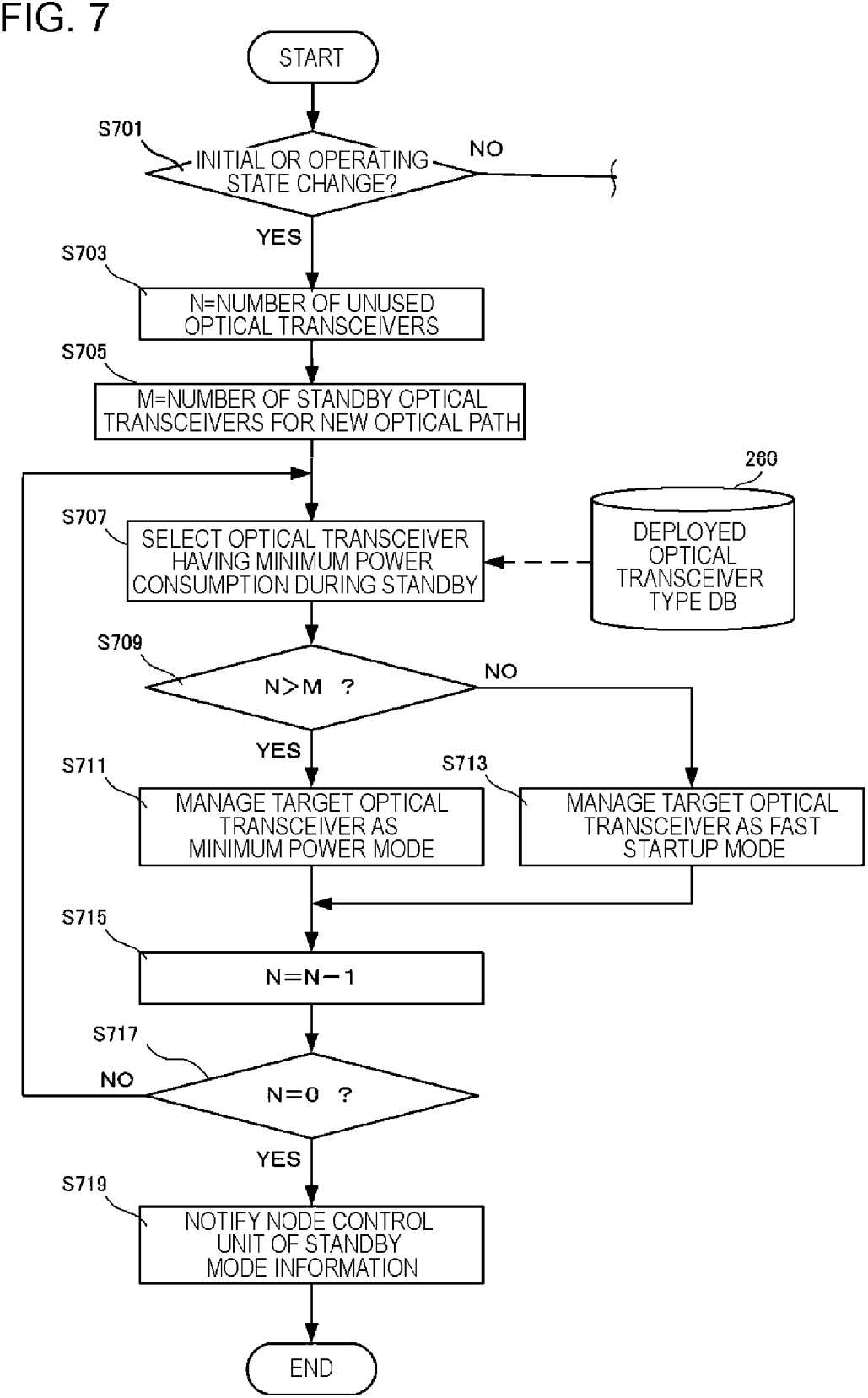
FIG. 7 is a flow diagram illustrating a processing procedure of a power consumption control unit according to the second exemplary embodiment of the invention.

FIG. 7 is a flow diagram illustrating a processing procedure of the power consumption control unit 230 according to the present exemplary embodiment. This flow diagram is executed by the CPU 610 of FIG. 6 using the RAM 680, and each function configuration unit of the power consumption control unit 230 shown in FIG. 2 is realized. Note that, this flow diagram is applied to all the cases where the power consumption control unit 230 performs power saving control on the optical transceiver group being on standby. In a first case, initial setting during configuring the node device is performed. In a second case, resetting during the addition/deletion of the optical transceiver is performed. In a third case, resetting during the establishment of the optical path is performed. In a fourth case, resetting during the deletion of the optical path is performed. Specific examples of the respective cases will be described in FIGS. 8 to 11.

First, in step S701, it is determined whether it is a change from the initial state (during power-ON or resetting) or the operating state of the node device 201. In other cases, another processing is performed.

When it is a change from the initial state or the operating state, the flow proceeds to step S703, and the number of unused optical transceivers is put into a variable N. An unused optical transceiver is an optical transceiver that does not emit light to a network. Next, in step S705, the number of optical transceivers to be on standby in a fast startup mode for establishing new optical path is put into a variable M. This is in order to set an optical transceiver for an optical path and an optical transceiver for backup thereof in a short time. Note that, a value of the variable M may be selected variously depending on the traffic of optical communication or the performance of the node device. Alternatively, the value of the variable M required for fast startup may be determined depending on the use condition of a network.

Next, in step S707, one optical transceiver having a minimum power consumption amount which is capable of being set during standby is selected from an unmanaged optical transceiver group, on the basis of the information of the deployed optical transceiver type DB 260. In step S709, it is determined whether the relation of N>M is satisfied. When the relation of N>M is satisfied, the flow proceeds to step S711, and the standby mode of the selected optical transceiver is set to a minimum power mode. Note that, since the minimum power mode does not exist in the conventional optical transceiver, as a result, the mode thereof is the same as the fast startup mode. This case is hereinafter described as (minimum power). When N≤M, the flow proceeds to step S713, and the optical transceiver is put on standby in a fast startup mode. In addition, the standby management table 233 is corrected on the basis of operating state information the setting of which is changed. An instruction is issued for each optical transceiver on the basis of the corrected standby management table 233, and the standby mode is set.

Next, in step S715, the variable N is decremented by 1. Next, in step S717, it is determined whether the value of the variable N is "0". When the relation of N=0 is not satisfied, an optical transceiver which is on standby in an unused state is left. Therefore, the flow returns to step S707, and returns again to the selection of the optical transceiver having minimum power consumption during standby. When N=0, there is no optical transceiver which is on standby in an unused state. Therefore, in step S719, the node control unit 240 is notified of the state of the standby management table 233, and the processing is terminated.

<<Specific Example of Power Saving Control>>

Hereinafter, the above-mentioned four specific cases will be described mainly with the state of the standby management table 233. Note that, in the following example, the number of optical transceivers to be on standby in a fast startup mode for new optical path establishment is set to M=2. In addition, it is assumed that the optical transceiver having the same standby minimum power consumption is selected in increasing order of No.

(Standby Mode Setting During Initial Period)

FIG. 8 is a diagram illustrating change 800 of the standby management table 233 during an initial period according to the present exemplary embodiment.

An item 810 of FIG. 8 is a state of the standby management table 233 before the processing of FIG. 7. A type 812, a minimum power consumption amount 813 capable of being set during standby, and an operating state 814 are stored in association with an optical transceiver No. 811. In the present example, ten optical transceivers are disposed from the optical transceiver No. 811. Optical transceivers 2, 6, and 9 are conventional types and optical transceivers 1, 3-5, 7-8, and 10 are energy-saving types. Since the operating states 814 of all are an unmanaged state, the variable N is set in step S703 as 10.

Steps S707 to S717 are repeated seven times, and thus the energy-saving optical transceivers 1, 3-5, 7-8, and 10 become in a standby state in a minimum power mode. Next, in the eighth execution of steps S707 to S717, the conventional optical transceiver 2 become in a standby state of (minimum power). Since the ninth and tenth executions of steps S707 to S717 satisfy the relation of N≤M, the conventional optical transceivers 6 and 9 become in a standby state in a fast startup mode.

An item 820 of FIG. 8 is a state of the standby management table 233 after the processing of FIG. 7. A type 822, a minimum power consumption amount 823 capable of being set during standby, and an operating state 824 are stored in association with an optical transceiver No. 821. In this example, the conventional optical transceivers 6 and 9 are set to be in a standby state in a fast startup mode, and other optical transceivers are managed in a minimum power mode.

When the processing of the present exemplary embodiment is not performed, it is possible that two energy-saving optical transceivers are set to be in a fast startup mode. The power consumption amount during standby is suppressed to be smaller by 40 W than that in the above case. In addition, the minimum power consumption amount capable of being set during standby is managed, thereby allowing to perform power saving control with taking into account the individual differences between the optical transceivers. In addition, even when there are a plurality of types of energy-saving optical transceivers, it is possible to perform power saving control with taking into account the difference between the electric power saving effects thereof.

(Standby Mode Setting During Optical Transceiver Addition)

FIG. 9 is a diagram illustrating change 900 of the standby management table 233 during optical transceiver addition according to the present exemplary embodiment. Operations of power saving control will be described by taking an example of a case where two optical transceivers are newly added from the configuration of FIG. 8. As shown in FIG. 9, information of a conventional optical transceiver 11 and an energy-saving optical transceiver 12 which are added is added into the standby management table 233. An item 910 of FIG. 9 is a state of the standby management table 233 before the processing of FIG. 7. A type 912, a minimum power consumption amount 913 capable of being set during standby, and an operating state 914 are stored in association with an optical transceiver No. 911. In this example, twelve optical transceivers are disposed from the optical transceiver No. 911. The optical transceivers 2, 6, 9, and 11 are conventional types and the optical transceivers 1, 3-5, 7-8, 10, and 12 are energy-saving types. In the operating state 914, unmanaged states of the optical transceivers 11 and 12 are added to the item 820 of FIG. 8. Therefore, the variable N is set in step S703 as 12.

Steps S707 to S717 are repeated eight times, and the energy-saving optical transceivers 1, 3-5, 7-8, 10, and 12 become in a standby state in a minimum power mode. Next, in the ninth and tenth executions of steps S707 to S717, the conventional optical transceivers 2 and 6 become in a standby state of (minimum power). Since the eleventh and twelfth executions of steps S707 to S717 satisfy the relation of N≤M, the conventional optical transceivers 9 and 11 become in a standby state in a fast startup mode.

An item 920 of FIG. 9 is a state of the standby management table 233 after the processing of FIG. 7. A type 922, a minimum power consumption amount 923 capable of being set during standby, and an operating state 924 are stored in association with an optical transceiver No. 921. In this example, the conventional optical transceivers 9 and 11 are set to be in a standby state in a fast startup mode, and other optical transceivers are managed in a minimum power mode.

Without the processing of the present exemplary embodiment, it is possible that two energy-saving optical transceivers are also set to be in a fast startup mode even in a case of optical transceiver addition similarly to an initial period. The power consumption amount during standby is suppressed to be smaller by 40 W than that in the above case. In addition, the minimum power consumption amount capable of being set during standby is managed, thereby allowing to perform power saving control taking into account the individual differences between the optical transceivers. In addition, even when there are a plurality of types of energy-saving optical transceivers, it is possible to perform power saving control taking into account the difference between the electric power saving effects thereof.

(Standby Mode Setting During Optical Path Establishment)

FIG. 10 is a diagram illustrating change 1000 of the standby management table 233 during optical path establishment (during optical transceiver startup) according to the present exemplary embodiment. Operations of power saving control will be described by taking an example of a case where two optical paths are established from the state of the item 920 of FIG. 9. Two conventional optical transceivers 9 and 11 which are on standby in a fast startup mode are set to be in an in-use state by establishing the optical path.

The state of the standby management table 233 before the processing of FIG. 7 in this case is shown in an item 1010 of FIG. 10. A type 1012, a minimum power consumption amount 1013 capable of being set during standby, and an operating state 1014 are stored in association with an optical transceiver No. 1011. In this example, since two conventional optical transceivers 9 and 11 are in use, the variable N is set in step S703 as 10 (=12−2).

Steps S707 to S717 are repeated eight times, and the energy-saving optical transceivers 1, 3-5, 7-8, 10, and 12 become in a standby state in a minimum power mode. Next, since the ninth and tenth execution of steps S707 to S717 satisfy the relation of N≤M, the conventional optical transceivers 2 and 6 are set to be in a standby state in a fast startup mode.

An item 1020 of FIG. 10 is a state of the standby management table 233 after the processing of FIG. 7. A type 1022, a minimum power consumption amount 1023 capable of being set during standby, and an operating state 1024 are stored in association with an optical transceiver No. 1021. In this example, the conventional optical transceivers 2 and 6 are set to be in a standby state in a fast startup mode, and other optical transceivers are managed in a minimum power mode.

Without the processing of the present exemplary embodiment, it is possible that two energy-saving optical transceivers are set to be in a fast startup mode even in a case of optical path establishment (optical transceiver startup). The power consumption amount during standby is suppressed to be smaller by 40 W than that in the above case. In addition, the minimum power consumption amount capable of being set during standby is managed, thereby allowing to perform power saving control taking into account the individual differences between the optical transceivers. In addition, even when there are a plurality of types of energy-saving optical transceivers, it is possible to perform power saving control taking into account the difference between the electric power saving effects thereof.

(Standby Mode Setting During Optical Path Deletion)

FIG. 11 is a diagram illustrating change 1100 of the standby management table 233 during optical path deletion (during optical transceiver release) according to the present exemplary embodiment. Operations of power saving control will be described by taking an example of a case where one optical path is deleted from the state of the item 1020 of FIG. 10. The conventional optical transceiver 9 in use is set to be in an unmanaged state by the deletion of the optical path.

The state of the standby management table 233 before the processing of FIG. 7 in this case is shown in an item 1110 of FIG. 11. In the present example, since one conventional optical transceiver 11 is in use, the variable N is set in step S703 as 11 (=12−1).

Steps S707 to S717 are repeated eight times, and the energy-saving optical transceivers 1, 3-5, 7-8, 10, and 12 are become in a standby state in a minimum power mode. Next, in the ninth execution of steps S707 to S717, the conventional optical transceiver 2 becomes in a standby state (minimum power). Since the tenth and eleventh executions thereof satisfy the relation of N≤M, the conventional optical transceivers 6 and 9 become in a standby state in a fast startup mode.

An item 1120 of FIG. 11 is a state of the standby management table 233 after the processing of FIG. 7. A type 1122, a minimum power consumption amount 1123 capable of being set during standby, and an operating state 1124 are stored in association with an optical transceiver No. 1121. In this example, the conventional optical transceiver 2 is changed from fast startup into (minimum power), the conventional optical transceiver 9 released from the optical path is set to be in a standby state in a fast startup mode, and other optical transceivers are managed in a minimum power mode. Note that, there are no difference between fast startup and (minimum power) for the conventional optical transceiver 2, but there is a difference in management by the power consumption control unit 230.

Without the processing of the present exemplary embodiment, it is possible that two energy-saving optical transceivers are set to be in a fast startup mode even in a case of optical path deletion (optical transceiver release.) The power consumption amount during standby is suppressed to be smaller by 40 W than that in the above case. In addition, the minimum power consumption amount capable of being set during standby is managed, thereby allowing to perform power saving control taking into account the individual differences between the optical transceivers. In addition, even when there are a plurality of types of energy-saving optical transceivers, it is possible to perform power saving control taking into account the difference between the electric power saving effects thereof.

As described above, in the second exemplary embodiment, the initial setting of the optical transceiver is performed, and thus power saving control, in which the energy-saving optical transceiver having small power consumption during standby is preferentially set to be in a minimum power mode, is performed on an unused optical transceiver. Thereby, it is possible to suppress the power consumption of the node device at all times without depending on the type of the optical transceiver.

Note that, this time, although the operating state of the unused optical transceiver is assumed to be in either of a fast startup mode, a minimum power mode, or an unmanaged state, it is not limited thereto. For example, power saving control can be performed on the optical transceiver which is on standby for backup and does not actually perform communication. However, the optical transceiver which is on standby for backup is associated with the established optical path. In order to maintain information associated therewith, the correction of the use condition table 242 or the standby management table 233 is required additionally.

In addition, although it is assumed that the types of standby modes instructed for the optical transceiver from the node device are only two modes of the minimum power mode and the fast startup mode in order of increasing power mode, they may include other standby modes. For example, the types may include a medium-speed startup mode midway between the minimum power mode and the fast startup mode. After an optical transceiver group which is on standby in the minimum power mode is determined, an optical transceiver group which is on standby in this medium-speed startup mode is determined in the same power saving control method as that of the present exemplary embodiment, thereby achieving a further reduction in power consumption.

In addition, items managed in the optical transceiver information are not limited to the present example. Although the transmission rates of two types of optical transceivers are the same as each other in the present exemplary embodiment, optical transceivers having different transmission rates are required to be deployed depending on the node device. In this case, the optical transceiver is managed for each different transmission rate, and power saving control is performed, thereby achieving the electric power saving of the node device.

Third Exemplary Embodiment

Next, an optical communication system according to a third exemplary embodiment of the present invention will be described. The optical communication system according to the present exemplary embodiment is different from the above-mentioned second exemplary embodiment, in that an optical transceiver which newly starts up is selected in a way that power consumption is reduced. Other configurations and operations are the same as those in the second exemplary embodiment, and thus the detailed description thereof will not be repeated.

According to the present exemplary embodiment, it is possible to achieve a further reduction in the total power consumption while maintaining the high reliability of a network by maintaining the number of optical transceivers capable of fast startup through the selection of not only an optical transceiver which is put on standby but also an optical transceiver which starts up.

<<Configuration of Optical Communication System>>

Figure 12:
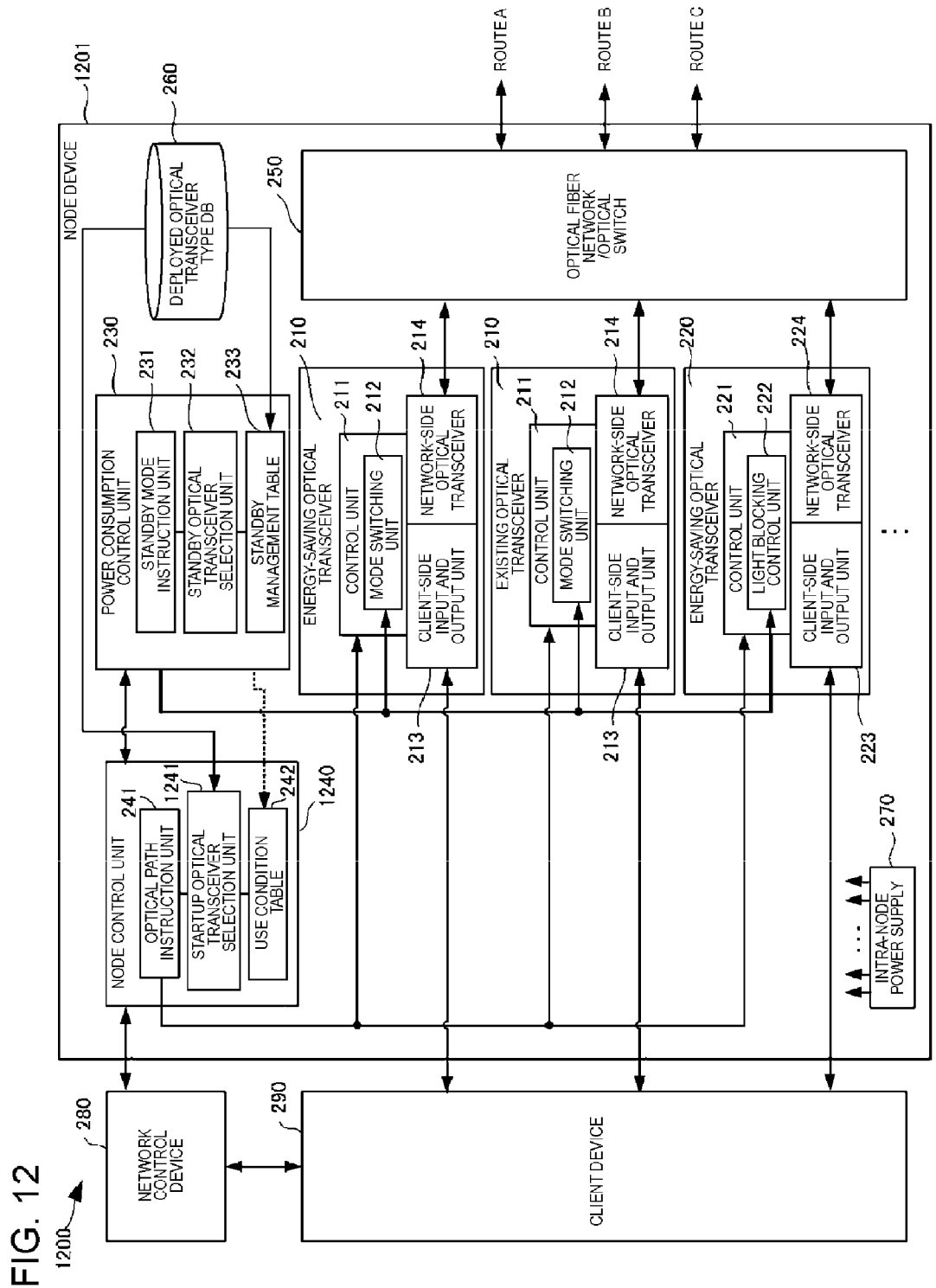
FIG. 12 is a block diagram illustrating a configuration of an optical communication system according to a third exemplary embodiment of the invention.

FIG. 12 is a block diagram illustrating a configuration of an optical communication system 1200 according to the present exemplary embodiment.

The optical communication system 1200 is different from the optical communication system 200 of FIG. 2, in that a node control unit 1240 includes a startup optical transceiver selection unit 1241, which selects an optical transceiver which starts up during optical path addition to allow reduction in power consumption. Since other configurations and operations are the same as those of the optical communication system 200 of FIG. 2, the same components and operations are assigned the same reference numerals and signs, and thus the detailed description thereof will not be repeated.

The startup optical transceiver selection unit 1241 selects an optical transceiver which starts up from the use condition table 242 having the current use condition of an optical transceiver stored therein, considering the type of the optical transceiver, the power consumption or startup time thereof, and the like which are accumulated in the deployed optical transceiver type DB 260, and the like.

<<Processing Procedure of Node Control Unit>>

Figure 13:
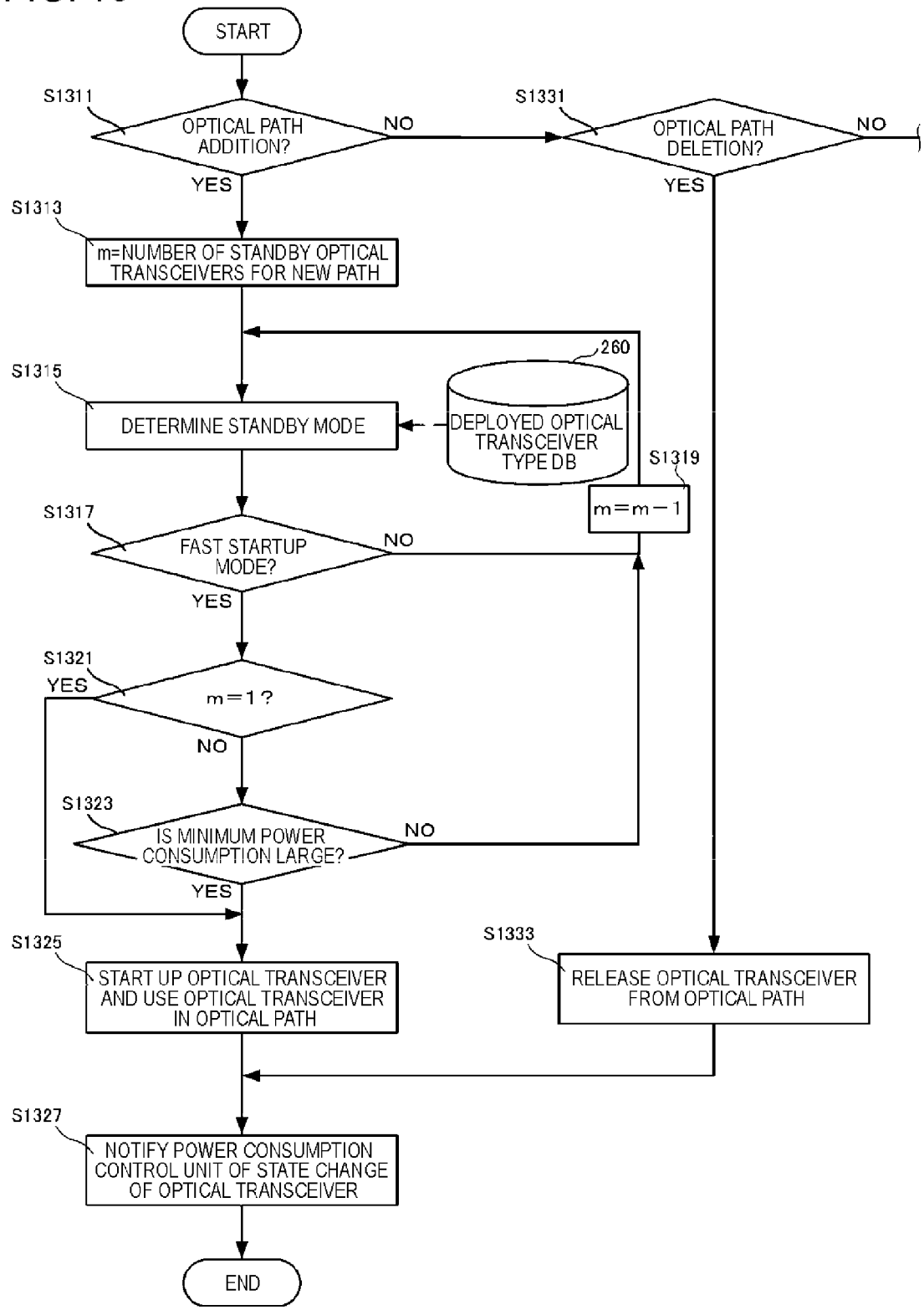
FIG. 13 is a flow diagram illustrating a processing procedure of a node control unit according to the third exemplary embodiment of the invention.

FIG. 13 is a flow diagram illustrating a processing procedure of the node control unit 1240 according to the present exemplary embodiment. CPU 600 of FIG. 6 executes this flow diagram using the RAM 640, and each function configuration unit of the node control unit 1240 shown in FIG. 12 is realized. Note that, in the flow diagram of FIG. 13, the processing procedure of the node control unit 1240 in a case of optical path deletion is also described.

First, in step S1311, it is determined whether or not an instruction from the network control device 280 is optical path addition. In addition, in step S1331, it is determined whether or not the instruction from the network control device 280 is optical path deletion. When the instruction is neither the optical path addition nor the optical path deletion, another processing is performed.

When the instruction is the optical path addition, the flow proceeds to step S1313, and the number of standby optical transceivers for a new path in a standby mode is put into a variable m. In step S1315, the standby mode of each standby optical transceiver is determined using data of the use condition table 242 (or, standby management table 233) with reference to the deployed optical transceiver type DB 260. Note that, in this example, the determination is made in ascending order of the optical transceiver No.

Next, in step S1317, it is determined whether or not the result of the standby mode determination is a high-speed standby mode. When the result is not the high-speed standby mode, the variable m is set to "−1" in step S1319. Then, the flow returns to step S1315, and the next standby optical transceiver is determined. When the result is the high-speed standby mode, the flow proceeds to step S1321, and it is determined whether or not the variable m=1 is satisfied. That is, it is determined whether or not a standby optical transceiver for a new path remains. When the variable m=1 is not satisfied, the flow proceeds to step S1323, and it is determined whether or not the target standby optical transceiver is of the type having a large minimum power consumption. That is, in the present exemplary embodiment, it is determined whether or not the target standby optical transceiver is the conventional optical transceiver. When the target standby optical transceiver is not the type having a large minimum power consumption (when the target standby optical transceiver is the energy-saving optical transceiver), the variable m is set to "−1" in step S1319, and the flow returns to step S1315.

When the minimum power consumption is large (when the target standby optical transceiver is the conventional optical transceiver), the flow proceeds to step S1325, and the target standby optical transceiver is started up and is used in an optical path to be added. In step S1327, the use condition table 242 is changed, and the power consumption control unit 230 is notified of the state change of the optical transceiver. Note that, when a standby optical transceiver remains (m=1) in the determination of step S1321, the flow proceeds to step S1325, and the target standby optical transceiver is started up and is used in the optical path to be added.

On the other hand, the flow proceeds to step S1333 in a case of the optical path deletion, and the optical transceiver used in an optical path to be deleted is released. In step S1327, the use condition table 242 is changed, and the power consumption control unit 230 is notified of the state change of the optical transceiver.

<<Specific Example of Power Saving Control>>

Hereinafter, a specific case of the optical path addition will be described mainly with the states of the use condition table 242 and the standby management table 233. Note that, in the following example, one optical path is added, and the number of optical transceivers to be on standby in a fast startup mode for establishing new optical path is set to M=3. In addition, the optical transceiver having the same standby minimum power consumption is assumed to be selected in ascending order of No.

FIG. 14 is a diagram illustrating a change of the use condition table 242 during optical transceiver startup according to the present exemplary embodiment. In FIG. 14, three optical transceivers are in operation, and three optical transceivers are on standby in a fast startup mode.

The state of the use condition table 242 before the processing of FIG. 13 in this case is shown in an item 1410 of FIG. 14. A type 1412 and an operating state 1413 are stored in association with an optical transceiver No. 1411. In this example, as a result of the processing of the second exemplary embodiment, three conventional optical transceivers 6, 9 and 11 are in use, and the variable m is set as m=(=12−3) in step S1313. In addition, although three optical transceivers 2, 10 and 12 are on standby in a fast startup mode, but one of them is the last existing optical transceiver 2 installed.

In a first determination, since an energy-saving optical transceiver 1 is on standby in a minimum power mode, the flow proceeds from step S1317 to step S1319, and the energy-saving optical transceiver 1 is maintained to be on standby in a minimum power mode. In a second determination, since the existing optical transceiver 2 is on standby in a fast startup mode and is an existing optical transceiver, the flow proceeds from step S1317 to steps S1321-S1323-S1325, and the existing optical transceiver is used in an optical path to be added. Meanwhile, for example, even when the energy-saving optical transceiver 1 is on standby in a fast startup mode, the flow proceeds from step S1323 to step S1319, and the energy-saving optical transceiver 1 is maintained to be on standby in a fast startup mode.

An item 1420 of FIG. 14 is a state of the use condition table 242 after the processing of FIG. 13. A type 1422 and an operating state 1423 are stored in association with an optical transceiver No. 1421. In this example, the conventional optical transceiver 2 is set to be in use.

In a case of optical path establishment (optical transceiver startup), without the processing of the present exemplary embodiment, it is possible that the energy-saving optical transceiver in a fast startup mode is used for an optical path to be added even when the conventional optical transceiver is on standby. The power consumption amount during standby is suppressed to be smaller by 5 W than that in the above case.

FIG. 15 is a diagram illustrating a change of the standby management table 233 during optical transceiver startup according to the present exemplary embodiment. Similarly, in FIG. 15, three optical transceivers are in operation, and three optical transceivers are on standby in a fast startup mode.

The state of the standby management table 233 before the processing of FIG. 7 in this case is shown in an item 1510 of FIG. 15. A type 1512, a minimum power consumption amount 1513 capable of being set during standby, and an operating state 1514 are stored in association with an optical transceiver No. 1511. In this example, as a result of the processing of FIG. 14, four conventional optical transceivers 2, 6, 9 and 11 are all in use, and the variable N is set as N=8(=12−4) in step S703. In addition, in this example, the variable M is set as M=3 in step S705.

Steps S707 to S717 are repeated five times, and the energy-saving optical transceivers 1, 3 to 5, and 7 become in a standby state in a minimum power mode. Next, the sixth to eighth execution of steps S707 to S717 satisfy the relation of N≤M, three energy-saving optical transceivers 8, 10, and 12 become in a standby state in a fast startup mode.

An item 1520 of FIG. 15 is a state of the standby management table 233 after the processing of FIG. 7. A type 1522, a minimum power consumption amount 1523 capable of being set during standby, and an operating state 1524 are stored in association with an optical transceiver No. 1521. In this example, energy-saving optical transceivers 8, 10, and 122 are set to be in a standby state in a fast startup mode, and other optical transceivers on standby are managed in a minimum power mode.

In the present example, since the conventional optical transceivers 2, 6, 9 and 11 are all set to be in use, the power consumption amount during standby is not reduced by the setting of the standby mode. However, the conventional optical transceivers 2, 6, 9 and 11 are all set to be in use as the result of the processing of the second exemplary embodiment and the third exemplary embodiment. For example, it is possible in an extreme case that four power-saving optical transceivers are in use and three power-saving transceivers are on standby in a fast startup mode without the processing of the second exemplary embodiment and the third exemplary embodiment. In the present example, up to 160 (=25×4+20×3)W is reduced as compared with this case. In this manner, the minimum power consumption amount capable of being set during standby is managed, thereby allowing to perform power saving control taking into account the individual differences between the optical transceivers. In addition, even when there are a plurality of types of energy-saving optical transceivers, it is possible to perform power saving control taking into account the difference between the electric power saving effects thereof.

Fourth Exemplary Embodiment

Next, an optical communication system according to a fourth exemplary embodiment of the present invention will be described. The optical communication system according to the present exemplary embodiment is different from the above-mentioned third exemplary embodiment, in that the node control unit and the power consumption control unit have a common hardware configuration. Since other configurations and operations are the same as those of the third exemplary embodiment, the same components and operations are assigned the same reference numerals and signs, and thus the detailed description thereof will not be repeated.

According to the present exemplary embodiment, it is possible to achieve a reduction in size by using a common hardware configuration and a reduction in total power consumption, while maintaining the high reliability of a network by maintaining the number of optical transceivers capable of fast startup.

<<Configuration of Optical Communication System>>

Figure 16:
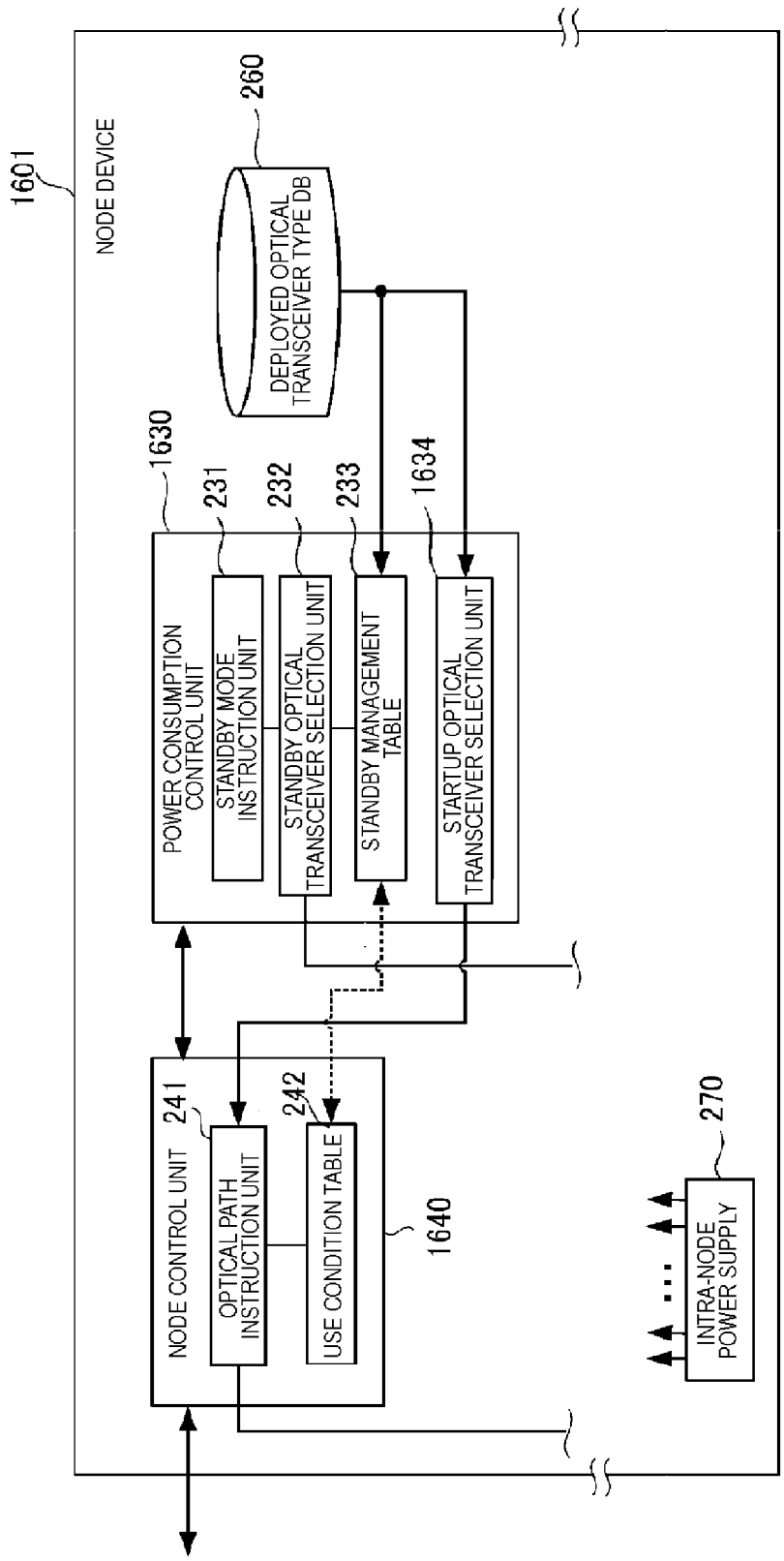
FIG. 16 is a block diagram illustrating a configuration of an optical communication system according to a fourth exemplary embodiment of the invention.

FIG. 16 is a block diagram illustrating a configuration of an optical communication system 1600 according to the present exemplary embodiment. Note that, since the optical communication system 1600 of FIG. 16 is partially changed in configuration within a node device 1601 and other configurations are the same as those in FIG. 12, the illustration and description thereof will not be repeated.

The optical communication system 1600 is different from the optical communication system 1200 of FIG. 12, in that a power consumption control unit 1630 uniformly uses the power consumption control unit in order to execute both the selection of the standby optical transceiver and the selection of the startup optical transceiver. This is because a node control unit 1640 and the power consumption control unit 1630 of the node device 1601 are implemented using one processor, and are configured not to perform inter-device communication. Since other configurations and operations which are not shown in FIG. 16 are the same as those of the optical communication system 1200 of FIG. 12, the detailed description thereof will not be repeated.

In FIG. 16, the power consumption control unit 1630 includes a startup optical transceiver selection unit 1634. Note that, the use condition table 242 is substantially the same as the standby management table 233, and the processing of the present exemplary embodiment can be performed even when the use condition table 242 is replaced by the standby management table 233.

<<Hardware Configuration of Node Device>>

Figure 17:
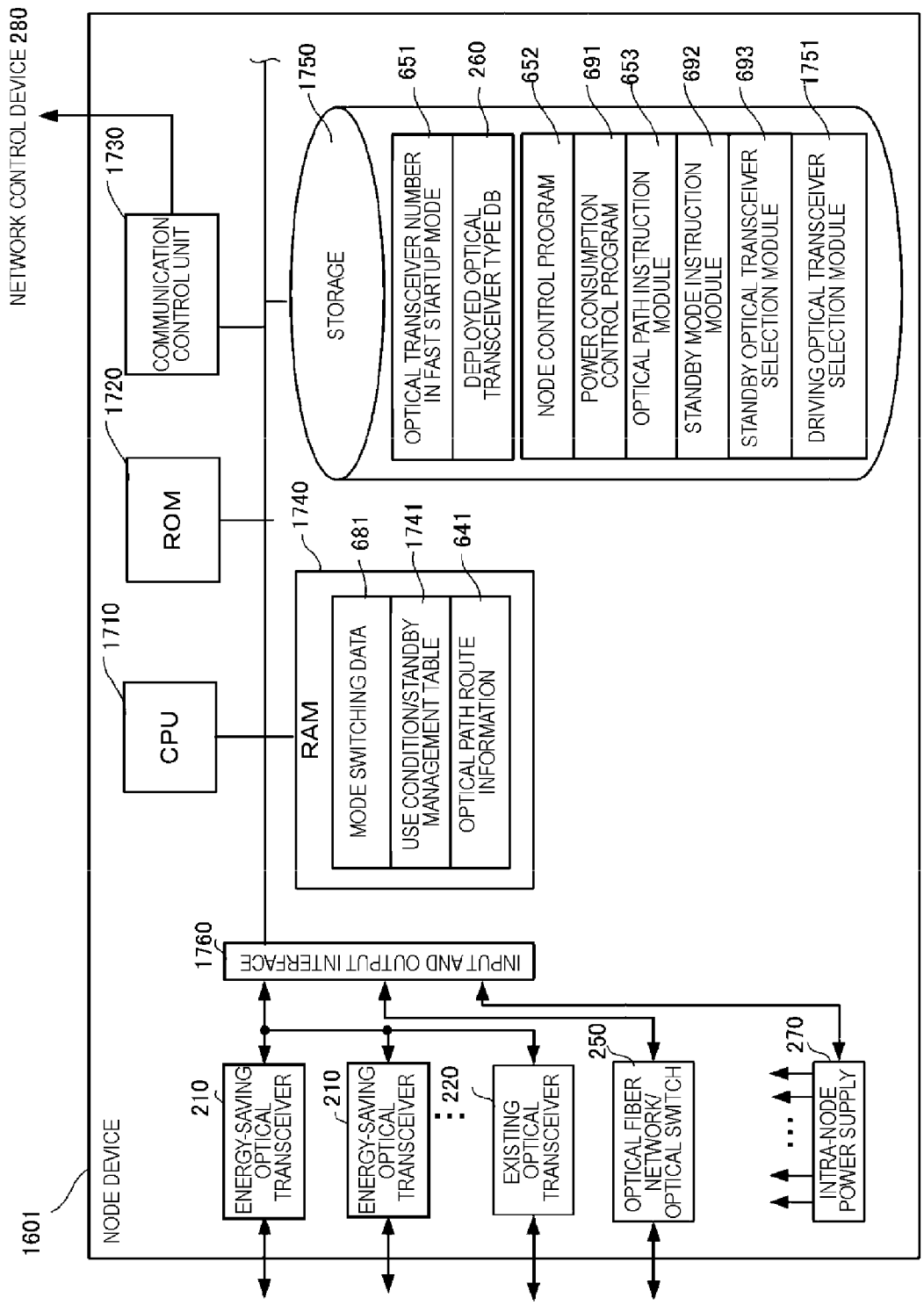
FIG. 17 is a block diagram illustrating a hardware configuration of a node device according to the fourth exemplary embodiment of the invention.

FIG. 17 is a block diagram illustrating a hardware configuration of the node device 1601 according to the present exemplary embodiment. Note that, in FIG. 17, the node control unit 1640 and the power consumption control unit 1630 are controlled by the same processor.

In FIG. 17, a CPU 1710 is a processor for arithmetic control, and realizes each function configuration unit shown in FIG. 16 by executing a program. A ROM 1720 stores initial data, fixed data for a program and the like, and a program. A communication control unit 1730 communicates with the network control device 280. The communication may be wireless or wired. In addition, the fixed data and the program may be stored in a storage 1750.

A RAM 1740 is a random access memory used as a temporary storage work area by the CPU 1710. Areas for storing data required for implementing the present exemplary embodiment are secured in the RAM 1740. Each of the areas store the optical path route information 641 received from the network control device 280, the mode switching data 681 indicating mode switching of each mode switching unit 212, and a use condition/standby management table 1741 used as both the use condition table and the standby management table. Note that, the storage 1750 may store the optical path route information 641, the mode switching data 681 and the use condition/standby management table 1741, and may read out and use them in the RAM 1740.

The storage 1750 is a mass storage device that stores a database, various types of parameters, and a program executed by the CPU 600, in a nonvolatile manner. The following data or program required for implementing the present exemplary embodiment is stored in the storage 1750. As the data, the optical transceiver number 651 in a fast startup mode that the node device 201 has to hold because of the setting from the network control device 280 is stored therein. In addition, the deployed optical transceiver type DB 260 is stored therein. In addition, in the present exemplary embodiment, as the program, the node control program 652 describing an optical path control procedure of the entire node device is stored therein. In addition, the power consumption control program 691 for controlling the power consumption of the entire node device is stored therein. In addition, the node control program 652 includes the optical path instruction module 653 that gives instruction for the startup/stop of each optical transceiver in accordance with an optical path. In addition, the power consumption control program 691 includes the standby mode instruction module 692 that gives instruction for a standby mode of each optical transceiver. In addition, the power consumption control program 691 includes the standby optical transceiver selection module 693 that selects a standby mode of the optical transceiver. In addition, the node control program 652 includes a driving optical transceiver selection module 1751 that selects an optical transceiver driven in accordance with the optical path addition.

An input and output interface 1760 is an interface for inputting data required for control of the CPU 1710, and outputting a control signal. The input and output interface 1760 works as an interface between the energy-saving optical transceiver 210, the conventional optical transceiver 220, the optical fiber network/optical switch 250, and the intra-node power supply 270.

Note that, in FIG. 17, only data and a program essential for the present exemplary embodiment are shown, and general-purpose data such as an OS and a program are not shown.

<<Processing Procedure of Node Device>>

Figure 18:
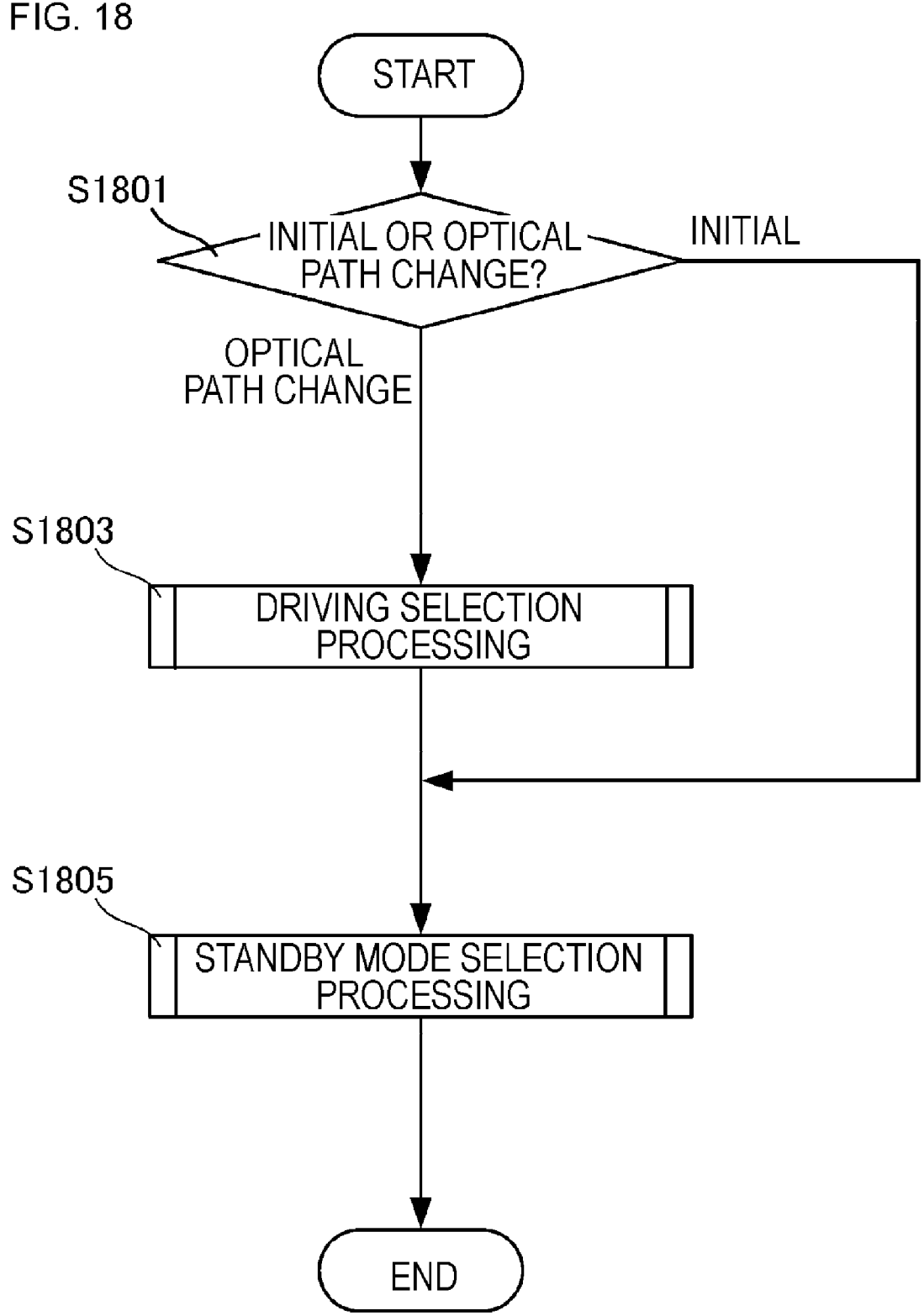
FIG. 18 is a flow diagram illustrating a processing procedure of the node device according to the fourth exemplary embodiment of the invention.

FIG. 18 is a flow diagram illustrating a processing procedure of the node device 1601 according to the present exemplary embodiment. CPU 1710 of FIG. 17 executes this flow diagram using the RAM 1740, and each function configuration unit shown in FIG. 16 is realized.

First, in step S1801, it is determined whether the state is an initial state (power-ON or clear) or optical path change (addition or deletion). In the case of an optical path change, the flow proceeds to step S1803. In the case of an optical path addition, the selection of a driving optical transceiver is instructed, or in the case of optical path deletion, a driving and selection processing in which an optical transceiver to be released is selected and driven is executed. Note that, the detailed description of the driving and selection processing in step S1803 is previously given with reference to FIG. 13, and thus the detailed description thereof herein will not be repeated. Next, in step S1805, standby mode selection processing is executed along with the operating state change according to the result of optical path instruction processing. Note that, the detailed description of the standby mode selection processing in step S1805 is previously given with reference to FIG. 7, and thus the detailed description thereof herein will not be repeated.

When it is an initial state in the determination of step S1801, the flow proceeds to step S1805, and only the standby mode selection processing is executed.

Fifth Exemplary Embodiment

Next, an optical communication system according to a fifth exemplary embodiment of the present invention will be described. The optical communication system according to the present exemplary embodiment is different from that of the above-mentioned third exemplary embodiment, in that the type of the optical transceiver is not accumulated in advance, and the type of the optical transceiver is determined during the standby and driving processing. Since other configurations and operations are the same as those of the second exemplary embodiment and the third exemplary embodiment, the same components and operations are assigned the same reference numerals and signs, and thus the detailed description thereof will not be repeated.

According to the present exemplary embodiment, a storage capacity for accumulating the type of the optical transceiver in advance is reduced, and thus it is possible to achieve a reduction in total power consumption while maintaining the high reliability of network by maintaining the number of optical transceivers capable of fast startup.

<<Configuration of Optical Communication System>>

Figure 19:
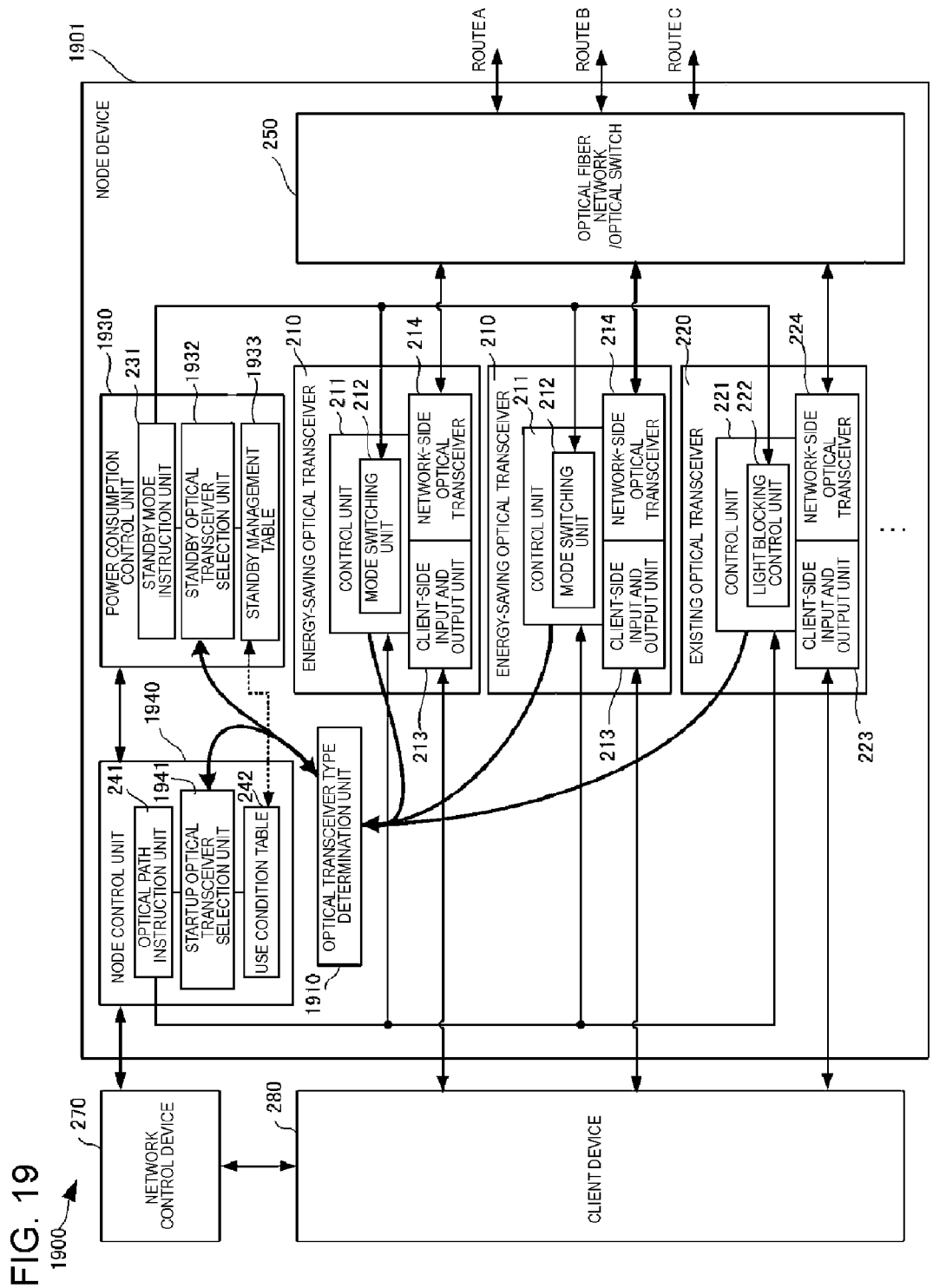
FIG. 19 is a block diagram illustrating a configuration of an optical communication system according to a fifth exemplary embodiment of the invention.

FIG. 19 is a block diagram illustrating a configuration of an optical communication system 1900 according to the present exemplary embodiment. Note that, since the optical communication system 1900 of FIG. 19 is partially changed in configuration within a node device 1901 and other configurations are the same as those in FIG. 12, the description thereof will not be repeated.

The optical communication system 1900 is different from the optical communication system 1200 of FIG. 12, in that there is no deployed optical transceiver type DB 260, and an optical transceiver type determination unit 1910 that determines the type of each optical transceiver is provided.

In the node device 1901 of FIG. 19, both a standby optical transceiver selection unit 1932 of a power consumption control unit 1930 and a startup optical transceiver selection unit 1941 of a node control unit 1940 are selected on the basis of a determination result of the optical transceiver type determination unit 1910. Note that, it is assumed that a standby management table 1933 stores a standby mode, power consumption and startup time, which correspond to the type. Since other configurations and operations are the same as those of the optical communication system 1200 shown in FIG. 12, the detailed description thereof will not be repeated.

(Optical Transceiver Type Determination Unit)

Figure 20:
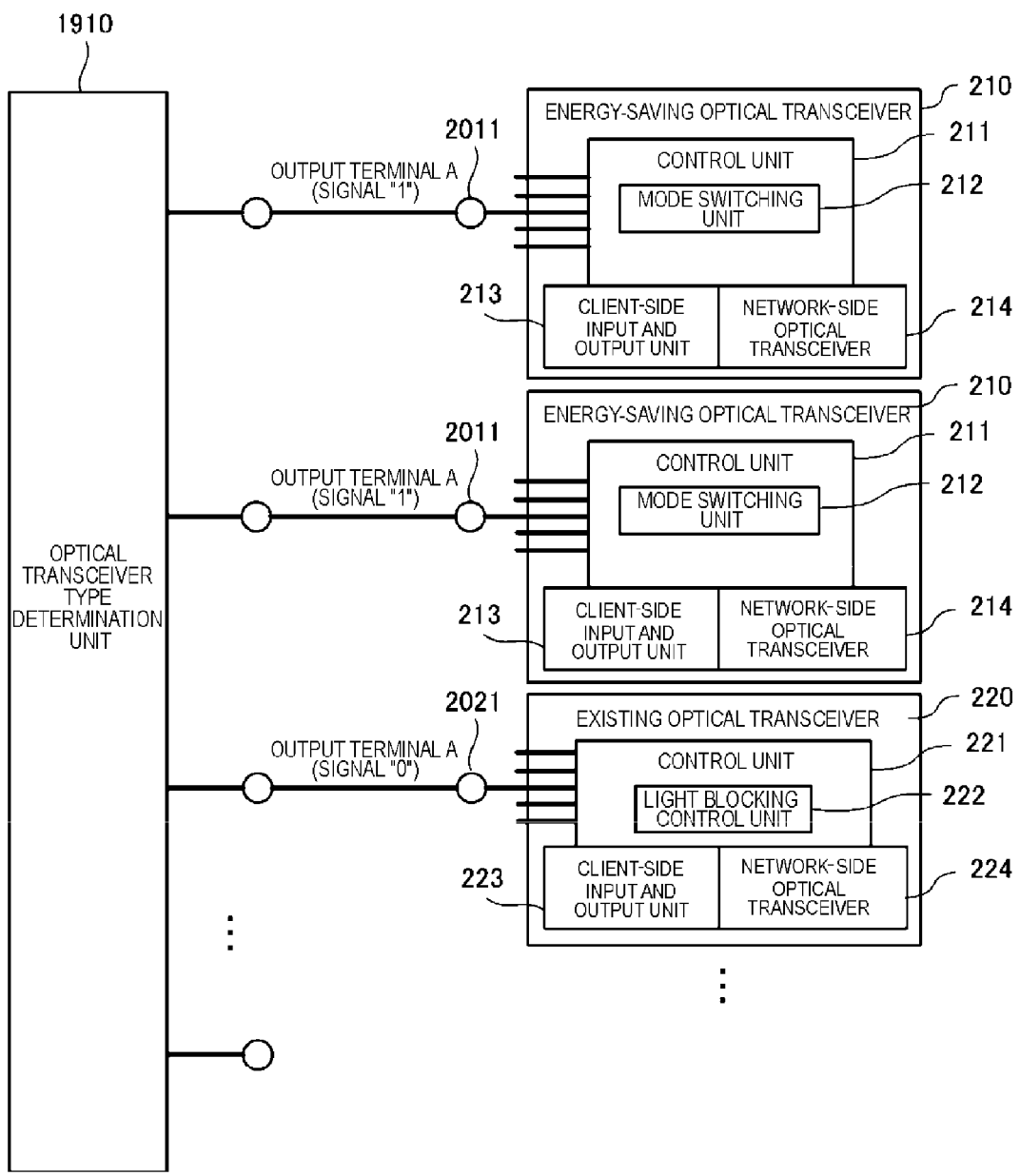
FIG. 20 is a diagram illustrating processing of an optical transceiver type determination unit according to the fifth exemplary embodiment of the invention.

FIG. 20 is a diagram illustrating processing of the optical transceiver type determination unit 1910 according to the present exemplary embodiment. Note that, since the configuration of the optical transceiver is the same as those in FIGS. 2 and 12, the description thereof will not be repeated.

The optical transceiver deployed in the node device 1901 includes an I/O port for a control signal. Among a plurality of output terminals of the I/O port from the control unit 211 of the energy-saving optical transceiver 210, an output terminal A(2011), which is an output terminal unused in the control unit 221 of the conventional optical transceiver 220, is used for determining the type of the optical transceiver. A signal of "1" is constantly applied to such an output terminal A(2011). On the other hand, an output terminal A(2021) of the conventional optical transceiver 220 has a signal of "0" constantly in an unused state.

As shown in FIG. 20, the optical transceiver type determination unit 1910 is connected to the output terminal A of each optical transceiver. For a type determination request of any optical transceiver from the power consumption control unit 1930, a signal of 1/0 of the output terminal A from the optical transceiver is confirmed, and it is determined whether the optical transceiver is an energy-saving type or a conventional type to give a response thereto.

In the present exemplary embodiment, the types of the optical transceivers are limited to two types of the energy-saving optical transceiver 210 and the conventional optical transceiver 220, and thus the type determination of the optical transceiver is implemented as a simple function of using only a "1/0 signal". Thereby, it is possible to reduce power consumption in the optical transceiver type determination unit 1910, and to achieve fast type determination of, for example, 1 millisecond or less by simple control. However, the configuration of the optical transceiver type determination unit 1910 is not limited thereto. When three types or more of optical transceivers are managed, or when three or more standby modes are managed, it is possible to use the configuration of the optical transceiver type determination unit through a plurality of terminals and multiple signals. Note that, the optical transceiver type determination unit 1910 may be implemented with a hardware configuration as shown in FIG. 20 in order to achieve high-speed processing, and may be included in the processing of the power consumption control unit 1930.

<<Processing Procedure of Power Consumption Control Unit>>

Figure 21:
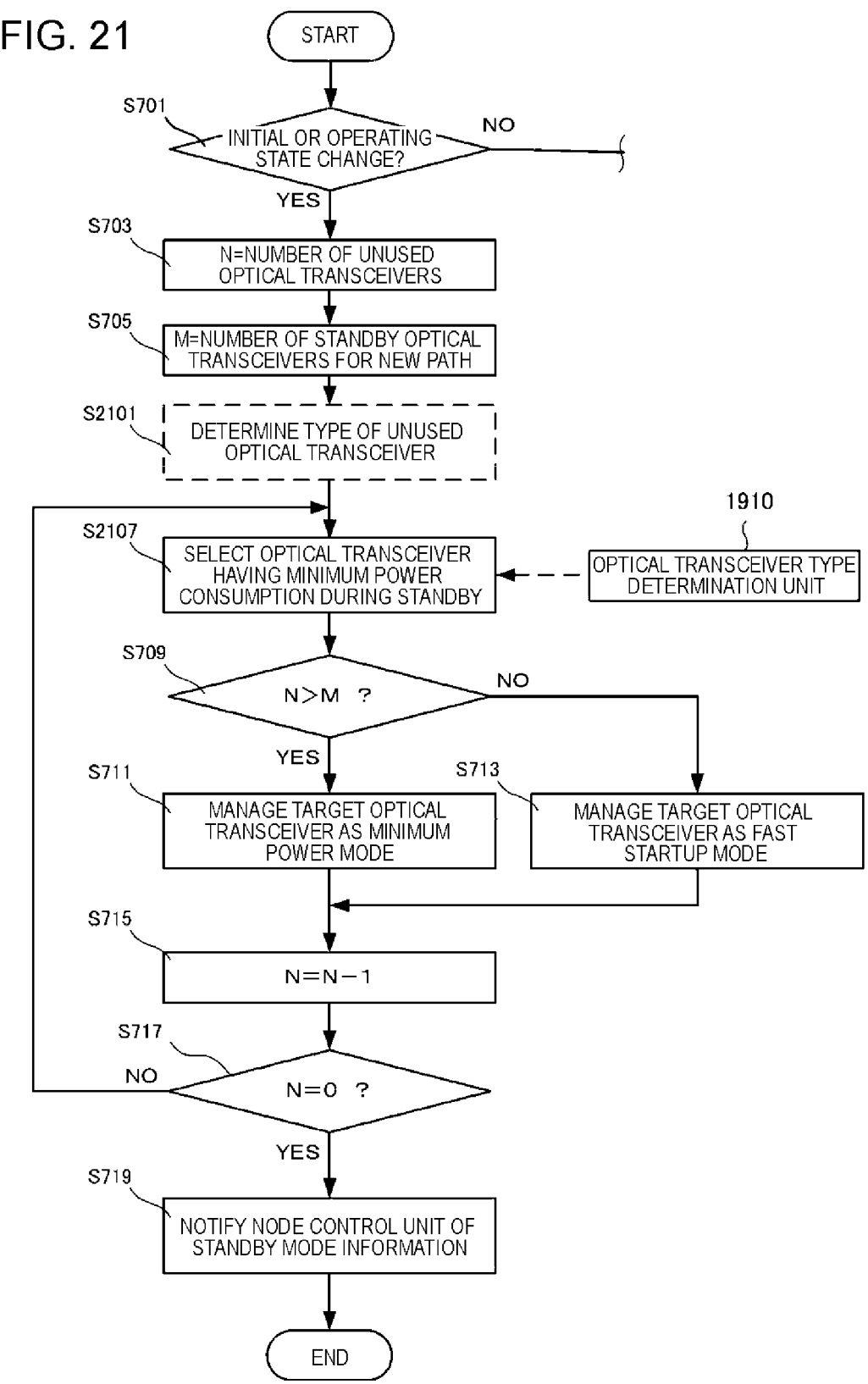
FIG. 21 is a flow diagram illustrating a processing procedure of a power consumption control unit according to the fifth exemplary embodiment of the invention.

FIG. 21 is a flow diagram illustrating a processing procedure of the power consumption control unit 1930 according to the present exemplary embodiment.

In the processing procedure of FIG. 21, acquiring of information from the deployed optical transceiver type DB 260 in step S707 in FIG. 7 is replaced by step S2107 where that is acquired from the optical transceiver type determination unit 1910. Processing of other steps is the same as that in FIG. 7, and thus the description thereof will not be repeated.

In addition, in FIG. 21, step S2101 shown in a broken line is a step when the optical transceiver type determination unit 1910 is implemented with software of the power consumption control unit 1930.

In this manner, it is not necessary to prepare a database for managing the type of the optical transceiver by preparing a mechanism capable of automatically detecting the type of the deployed optical transceiver, and management cost can be reduced. Further, memory capacity can be reduced since the standby management table 1933 uniformly manages the standby states, which is managed in the deployed optical transceiver type DB 260, and thereby being able to achieve a reduction in device cost.

Note that, although the optical transceiver type determination unit 1910 used this time is directly connected to all the deployed optical transceivers, other configurations are also included in the scope thereof. For example, a configuration is also considered in which 1×N switches are disposed between the optical transceiver type determination unit 1910 and N optical transceivers. While performing switching by the switch when determining the type of the optical transceiver, information indicating the type and power consumption of the optical transceiver is detected. Thereby, the configuration of the optical transceiver type determination unit 1910 is simplified, and it is thus possible to further reduce power consumption and to establish an inexpensive system.

Other Exemplary Embodiments

So far, the exemplary embodiments of the invention have been described in detail. However, a system or an apparatus in which various characteristics included in each of the exemplary embodiments are combined in various ways is also included in the scope of the invention.

In addition, the invention may be applied to a system comprising a plurality of devices, or may be applied to a single apparatus. Further, the invention can also be applied in a case where a control program for implementing functions of an exemplary embodiment is directly or remotely provided to a system or an apparatus. Therefore, in order to implement the functions of the invention using a computer, a control program installed in the computer, a medium storing the control program, and a worldwide web (WWW) server causing the control program to be downloaded are included in the scope of the invention.

In addition, the present invention is not limited to the optical transceiver, and is able to be applied to a device which has a plurality of types of components and requires power saving control. According to the present exemplary embodiments, in terms of a node device including a plurality of types in the optical transceiver, it is possible to make the node device in which the power consumption amount during standby of the optical transceiver group is suppressed to be small. Further, according to the present exemplary embodiments, it is possible to achieve a node device which is capable of establishing an optical path in which startup can be performed in a shorter time than the allowable time of the interruption time of communication services in the optical communication system. Further, according to the present exemplary embodiment, among a plurality of optical transceivers on standby, optical transceivers required for failure recovery are set to be in a state capable of fast startup from the use condition of the optical transceivers, and the other optical transceivers are set to be in a minimum power use state. Thereby, it is possible to reduce the power consumption of the optical transceiver. Further, according to the present exemplary embodiment, it is possible to automatically determine the type of the optical transceiver, and to make a reduction in operational cost. Further, according to the present exemplary embodiment, by applying to the entire network, the power consumption of not only the node but also the entire network can be reduced.

Other Representation of Exemplary Embodiment

Some or all of the above-mentioned exemplary embodiments may be described as the following appendices, but are not limited thereto.

Appendix 1

A node device in an optical communication system in which a plurality of the node devices are connected by a plurality of optical fibers, comprising:
at least a first optical transceiver that consumes a first power consumption amount during standby;
at least a second optical transceiver that consumes a second power consumption amount greater than the first power consumption amount during standby; and
a power consumption control unit that preferentially selects the second optical transceiver as an optical transceiver to be maintained in a fast startup standby mode in which startup time from a standby state is shorter than allowable time of interruption time of a communication service in the optical communication system.

Appendix 2

The node device according to appendix 1, wherein the power consumption control unit preferentially starts up the second optical transceiver which is in the fast startup standby mode, when an optical transceiver is started up from optical transceivers on standby.

Appendix 3

The node device according to appendix 1 or 2,
wherein the first optical transceiver has a plurality of standby modes including at least a first standby mode in which startup time from a standby state of an optical transceiver is shorter than the allowable time of the interruption time of a communication service in the optical communication system and the optical transceiver consumes a first power amount, and a second standby mode in which the startup time from the standby state of the optical transceiver is longer than the allowable time and the optical transceiver consumes a second power amount smaller than the first power amount, and
wherein the power consumption control unit sets the first optical transceiver, which is not selected as an optical transceiver to be maintained by the node device, to be in the second standby mode.

Appendix 4

The node device according to appendix 3,
wherein the second optical transceiver has a plurality of standby modes including at least a third standby mode in which startup time from a standby state of an optical transceiver is shorter than the allowable time of the interruption time of a communication service in the optical communication system and the optical transceiver consumes a third power amount, and a fourth standby mode in which the startup time from the standby state of the optical transceiver is longer than the allowable time and the optical transceiver consumes a fourth power amount smaller than the third power amount,
wherein the power consumption control unit selects the second optical transceiver as the optical transceiver to be maintained by the node device when the second power amount is smaller than the fourth power amount, and sets the first optical transceiver, which is not selected as the optical transceiver to be maintained by the node device, to be in the second standby mode, and
wherein the power consumption control unit selects the first optical transceiver as the optical transceiver to be maintained by the node device when the fourth power amount is smaller than the second power amount, and sets the second optical transceiver, which is not selected as the optical transceiver to be maintained by the node device, to be in the fourth standby mode.

Appendix 5

The node device according to appendix 4, wherein when an optical transceiver is started up from optical transceivers on standby, the power consumption control unit:
starts up the second optical transceiver on standby when the first power amount is smaller than the third power amount; and
starts up the first optical transceiver on standby when the third power amount is smaller than the first power amount.

Appendix 6

The node device according to any one of appendices 1 to 5, further comprising a storage unit that stores a power consumption amount in a startup mode and a standby mode in association with types of a plurality of optical transceivers including the first optical transceiver and the second optical transceiver,
wherein the power consumption control unit controls setting of a standby mode or starting up for an optical transceiver, with reference to the power consumption amount stored in the storage unit corresponding to the type of the optical transceiver.

Appendix 7

The node device according to any one of appendices 1 to 6, further comprising an optical transceiver type determination unit that determines types of a plurality of optical transceivers including the first optical transceiver and the second optical transceiver,
wherein the power consumption control unit controls setting of a standby mode or starting up for an optical transceiver, on the basis of the type of the optical transceiver that the optical transceiver type determination unit determines.

Appendix 8

A method of controlling a node device in an optical communication system in which a plurality of the node devices are connected by a plurality of optical fibers, the node device including at least one first optical transceiver that consumes a first power consumption amount during standby and at least one second optical transceiver that consumes a second power consumption amount greater than the first power consumption amount during standby, the method comprising:
a power consumption control step of preferentially selecting the second optical transceiver as an optical transceiver to be maintained in a fast startup standby mode in which startup time from a standby state is shorter than allowable time of interruption time of a communication service in the optical communication system.

Appendix 9

The method of controlling a node device according to appendix 8, wherein the power consumption control step includes:
a step of selecting a plurality of optical transceivers to be in a standby mode in order from the first optical transceiver with a standby mode having a smaller power consumption amount; and
a step of putting on standby the selected first optical transceiver in a standby mode having a smallest power consumption amount.

Appendix 10

The method of controlling a node device according to appendix 8 or 9, wherein the power consumption control step further includes a step of preferentially starting up the second optical transceiver which is in the fast startup standby mode, when an optical transceiver is started up from optical transceivers on standby.

Appendix 11

A method of controlling a node device in an optical communication system in which a plurality of the node devices are connected by a plurality of optical fibers, the node device including at least a first optical transceiver that consumes a first power consumption amount during standby and at least a second optical transceiver that consumes a second power consumption amount greater than the first power consumption amount during standby, the method comprising a power consumption control step of preferentially selecting the second optical transceiver as an optical transceiver to be maintained in a fast startup standby mode in which startup time from a standby state is shorter than allowable time of interruption time of a communication service in the optical communication system, wherein the power consumption control step includes:
a step of selecting a plurality of optical transceivers to be in a standby mode in order from the first optical transceiver with a standby mode having a smaller power consumption amount; and
a step of putting on standby the selected first optical transceiver in a standby mode having a smallest power consumption amount.

Appendix 12

The method of controlling a node device according to appendix 11, wherein the power consumption control step further includes a step of preferentially starting up the second optical transceiver which is in the fast startup standby mode, when an optical transceiver is started up from optical transceivers on standby.

Appendix 13

A control program of a node device in an optical communication system in which a plurality of the node devices are connected by a plurality of optical fibers, the node device including at least a first optical transceiver that consumes a first power consumption amount during standby and at least a second optical transceiver that consumes a second power consumption amount greater than the first power consumption amount during standby, the program causing a computer to execute a power consumption control step of preferentially selecting the second optical transceiver as an optical transceiver to be maintained in a fast startup standby mode in which startup time from a standby state is shorter than allowable time of interruption time of a communication service in the optical communication system.

Appendix 14

The control program according to appendix 13, wherein the power consumption control step includes:
a step of selecting a plurality of optical transceivers to be in a standby mode in order from the first optical transceiver with a standby mode having a smaller power consumption amount; and
a step of putting on standby the selected first optical transceiver in a standby mode having a smallest power consumption amount.

Appendix 15

The control program according to appendix 13 or 14, wherein the power consumption control step further includes a step of preferentially starting up the second optical transceiver which is in the fast startup standby mode, when an optical transceiver is started up from an optical transceiver on standby.

Appendix 16

A control program of a node device in an optical communication system in which a plurality of the node devices are connected by a plurality of optical fibers, the node device including at least a first optical transceiver that consumes a first power consumption amount during standby and at least a second optical transceiver that consumes a second power consumption amount greater than the first power consumption amount during standby, the program causing a computer to execute a power consumption control step of preferentially selecting the second optical transceiver as an optical transceiver to be maintained in a fast startup standby mode in which startup time from a standby state is shorter than allowable time of interruption time of a communication service in the optical communication system, wherein the power consumption control step includes:
a step of selecting a plurality of optical transceivers to be in a standby mode in order from the first optical transceiver with a standby mode having a smaller power consumption amount; and
a step of putting on standby the selected first optical transceiver in a standby mode having a smallest power consumption amount.

Appendix 17

The control program according to appendix 16, wherein the power consumption control step further includes a step of preferentially starting up the second optical transceiver which is in the fast startup standby mode, when an optical transceiver is started up from optical transceivers on standby.

Appendix 18

An optical communication system in which a plurality of node devices are connected by a plurality of optical fibers, comprising:
a network control unit that sets the number of optical transceivers to be maintained in a fast startup standby mode in which startup time from a standby state is shorter than allowable time of interruption time of a communication service in the optical communication system, for each of the plurality of node devices,
wherein each of the plurality of node devices includes:
at least a first optical transceiver that consumes a first power consumption amount during standby;
at least a second optical transceiver that consumes a second power consumption amount greater than the first power consumption amount during standby; and
a power consumption control unit that preferentially selects the second optical transceiver as the optical transceiver to be maintained by the node device, the second optical transceiver being in the fast startup standby mode.

Appendix 19

The optical communication system according to appendix 18, wherein the power consumption control unit preferentially starts up the second optical transceiver which is in the fast startup standby mode, when an optical transceiver is started up from optical transceivers on standby.

Appendix 20

A power saving method in an optical communication system in which a plurality of node devices are connected by a plurality of optical fibers, and each of the plurality of node devices includes at least a first optical transceiver that consumes a first power consumption amount during standby and at least a second optical transceiver that consumes a second power consumption amount greater than the first power consumption amount during standby, the method comprising:
a setting step of setting the number of optical transceivers to be maintained in a fast startup standby mode in which startup time from a standby state is shorter than allowable time of interruption time of a communication service in the optical communication system, for each of the plurality of node devices; and
a power consumption control step of causing the plurality of node devices to preferentially select the second optical transceiver as the optical transceiver to be maintained by the node device.

Appendix 21

The power saving method according to appendix 20, wherein the power consumption control step further includes a step of preferentially starting up the second optical transceiver which is in the fast startup standby mode, when an optical transceiver is started up from optical transceivers on standby.

This application claims priority from Japanese Patent Application No. 2011-191704 filed on Sep. 2, 2011, the content of which is incorporated herein by reference in its entirety.

The invention claimed is:

1. A node device in an optical communication system in which a plurality of the node devices are connected by a plurality of optical fibers, the node device comprising:
a first optical transceiver that enters into either a first standby mode or a second standby mode, a startup time from the first standby mode being shorter than a down-time of a communication service in the optical communication system, a startup time from the second standby mode being longer than the startup time from the first standby mode, a power consumption of the first optical transceiver in the second standby mode being lower than a power consumption of the first optical transceiver in the first standby mode;
a second optical transceiver that enters into a third standby mode, a startup time from the third standby mode being shorter than the down-time, a power consumption of the second optical transceiver in the second standby mode being larger than the power consumption of the first optical transceiver in the second standby mode, the second optical transceiver not entering a standby mode from which a startup time being larger than the down-time; and
a power consumption control unit that preferentially performs a process of setting the second optical transceiver into the third standby mode rather than a process of setting the first optical transceiver into the third standby mode when setting at least one of optical transceivers into a standby mode from which a startup time is shorter than the down-time.

2. The node device according to claim 1, wherein the power consumption control unit preferentially starts up one of the first optical transceivers and the second optical transceivers being in a standby mode from which a startup time is shorter than the down-time.

3. The node device according to claim 1, further comprising an optical transceiver type determination unit that determines types of a plurality of optical transceivers including the first optical transceiver and the second optical transceiver, wherein the power consumption control unit controls setting of a standby mode or starting up for an optical transceiver, on the basis of the type of the optical transceiver that the optical transceiver type determination unit determines.

4. A method of controlling a node device in an optical communication system in which a plurality of the node devices are connected by a plurality of optical fibers, the node device including: a first optical transceiver that enters into either a first standby mode or a second standby mode, a startup time from the first standby mode being shorter than a down-time of a communication service in the optical communication system, a startup time from the second standby mode being longer than the startup time from the first standby mode, a power consumption of the first optical transceiver in the second standby mode being lower than a power consumption of the first optical transceiver in the first standby mode; and a second optical transceiver that enters into a third standby mode, a startup time from the third standby mode being shorter than the down-time, a power consumption of the second optical transceiver in the second standby mode being larger than the power consumption of the first optical transceiver in the second standby mode, the second optical transceiver not entering a standby mode from which a startup time being larger than the down-time,
the method comprising a power consumption control step of preferentially performing a process of setting the second optical transceiver into the third standby mode rather than a process of setting the first optical transceiver into the first standby mode when setting at least one of optical transceivers into a standby mode from which a startup time is shorter than the down-time.

5. The method of controlling a node device according to claim 4, wherein the power consumption control step further includes a step of preferentially starting up one of the first optical transceivers and the second optical transceivers being in a standby mode from which a startup time is shorter than the down-time.

6. A non-transitory computer-readable storage medium storing a control program of a node device in an optical communication system in which a plurality of the node devices are connected by a plurality of optical fibers, the node device including: a first optical transceiver enters into either a first standby mode or a second standby mode, a startup time from the first standby mode being shorter than a down-time of a communication service in the optical communication system, a startup time from the second standby mode being longer than the startup time from the first standby mode, a power consumption of the first optical transceiver in the second standby mode being lower than a power consumption of the first optical transceiver in the first standby mode; and a second optical transceiver enters into a third standby mode, a startup time from the third standby mode being shorter than the down-time, a power consumption of the second optical transceiver in the second standby mode being larger than the power consumption of the first optical transceiver in the second standby mode being the second optical transceiver not entering a standby mode from which a startup time being larger than the down-time,
the program causing a computer to execute a power consumption control step of preferentially performing a process of setting the second optical transceiver into the third standby mode rather than a process of setting the first optical transceiver into the first standby mode when setting at least one of optical transceivers into a standby mode from which a startup time is shorter than the down-time.

7. The control program according to claim 6, wherein the power consumption control step further includes a step of preferentially starting up one of the first optical transceivers and the second optical transceivers being in a standby mode from which a startup time is shorter than the down-time.

8. The node device according to claim 1, wherein output light or input light between the plurality of optical fibers and the second optical transceiver being in the third standby mode is shut out.

9. The node device according to claim 1, wherein when the first optical transceiver is in the first standby mode and the second optical transceiver is in the third standby mode, the power consumption control unit performs:

starting up the first optical transceiver being in the first standby mode when the power consumption of the first optical transceiver being in the first standby is larger than the power consumption of the second optical transceiver being in the third standby mode; and starting up the second optical transceiver being in the third standby when the power consumption of the second optical transceiver being in the third standby is larger than the power consumption of the first optical transceiver being in the first standby mode.

10. The node device according to claim 1, wherein the second optical transceiver enters into either the third standby mode or a fourth standby mode, a startup time from the fourth standby mode being longer than the startup time from the third standby mode, a power consumption of the second optical transceiver in the fourth standby mode being lower than the power consumption of the second optical transceiver in the third standby mode, wherein the power consumption of the first optical transceiver being in the second standby mode is different from a power consumption of the second optical transceiver being in the fourth standby mode, and wherein the power consumption control unit performs:

a process of setting the first optical transceiver into the first standby mode and a process of setting the second optical transceiver into the fourth standby mode when the power consumption of the first optical transceiver being in the second standby mode is larger than the power consumption of the second optical transceiver being in the fourth standby mode; and a process of setting the first optical transceiver into the second standby mode and a process of setting the second optical transceiver into the third standby mode when the power consumption of the first optical transceiver being in the second standby mode is less than the power consumption of the second optical transceiver being in the fourth standby mode.

* * * * *